United States Patent
Lee et al.

(10) Patent No.: US 12,098,158 B2
(45) Date of Patent: Sep. 24, 2024

(54) TRANSITION METAL COMPOUND, CATALYST COMPOSITION AND METHOD FOR PREPARING POLYPROPYLENE USING THE SAME

(71) Applicant: LG Chem, Ltd., Seoul (KR)

(72) Inventors: Insun Lee, Daejeon (KR); Seok Hwan Kim, Daejeon (KR); Byung Seok Kim, Daejeon (KR); Donghyeon Gwon, Daejeon (KR); Sangjin Jeon, Daejeon (KR); Seyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 725 days.

(21) Appl. No.: 17/422,998

(22) PCT Filed: Mar. 4, 2020

(86) PCT No.: PCT/KR2020/003046
§ 371 (c)(1),
(2) Date: Jul. 14, 2021

(87) PCT Pub. No.: WO2020/184888
PCT Pub. Date: Sep. 17, 2020

(65) Prior Publication Data
US 2022/0098225 A1    Mar. 31, 2022

(30) Foreign Application Priority Data
Mar. 13, 2019 (KR) .................. 10-2019-0028866

(51) Int. Cl.
*C07F 17/00* (2006.01)
*C08F 4/6592* (2006.01)
*C08F 4/76* (2006.01)
*C08F 210/06* (2006.01)

(52) U.S. Cl.
CPC .......... *C07F 17/00* (2013.01); *C08F 4/65927* (2013.01); *C08F 4/76* (2013.01); *C08F 210/06* (2013.01)

(58) Field of Classification Search
CPC ..... C07F 17/00; C08F 4/65927; C08F 110/06
See application file for complete search history.

(56) References Cited

U.S. PATENT DOCUMENTS

| | | |
|---|---|---|
| 6,355,747 B1 | 3/2002 | Rausch et al. |
| 2014/0179872 A1 | 6/2014 | Fiscus et al. |
| 2014/0179884 A1 | 6/2014 | McCullough |
| 2016/0208028 A1 | 7/2016 | Choi et al. |
| 2017/0037165 A1 | 2/2017 | Ajellal et al. |
| 2017/0114168 A1 | 4/2017 | Alliger et al. |
| 2017/0342175 A1 | 11/2017 | Hagadorn et al. |
| 2018/0201630 A1 | 7/2018 | Yang et al. |
| 2019/0263942 A1 | 8/2019 | Jeong et al. |
| 2019/0270833 A1 | 9/2019 | Chae et al. |
| 2020/0010589 A1 | 1/2020 | Lee et al. |
| 2020/0199165 A1 | 6/2020 | Friederichs et al. |

FOREIGN PATENT DOCUMENTS

| | | |
|---|---|---|
| CN | 104822697 A | 8/2015 |
| CN | 108137729 A | 6/2018 |
| CN | 109312013 A | 2/2019 |
| CN | 109415450 A | 3/2019 |
| EP | 1077215 A1 | 2/2001 |
| EP | 2935297 A1 | 10/2015 |
| JP | 2014070029 A | 4/2014 |
| JP | 2017145303 A | 8/2017 |
| KR | 20150037652 A | 4/2015 |
| KR | 20160147835 A | 12/2016 |
| KR | 20170073439 A | 6/2017 |
| KR | 101811141 B1 | 12/2017 |
| KR | 20180087868 A | 8/2018 |
| KR | 101903245 B1 | 10/2018 |
| KR | 101903892 B1 | 11/2018 |
| KR | 20190019598 A | 2/2019 |
| WO | 2009054833 A2 | 4/2009 |
| WO | 2014099303 A1 | 6/2014 |
| WO | 2015065681 A1 | 5/2015 |
| WO | 2017026605 A1 | 2/2017 |
| WO | 2017069854 A1 | 4/2017 |
| WO | 2018097468 A1 | 5/2018 |
| WO | 2018185176 A1 | 10/2018 |

OTHER PUBLICATIONS

International Search Report for Application No. PCT/KR2020/003046, mailing dated Jun. 17, 2020, 2 pages.
Extended European Search Report and European Search Opinion for European Patent Application No. 20769061.1 dated Jan. 31, 2022, 7 pgs.

*Primary Examiner* — Caixia Lu
(74) *Attorney, Agent, or Firm* — Lerner David LLP

(57) ABSTRACT

The present disclosure relates to a novel transition metal compound of the following Chemical Formula 1, which exhibits high hydrogen reactivity with excellent catalytic activity for propylene polymerization, and is useful in the preparation of a polypropylene having a narrow molecular weight distribution and a low melting point, a catalyst composition including the same, and a method for preparing a polypropylene using the same,

[Chemical Formula 1]

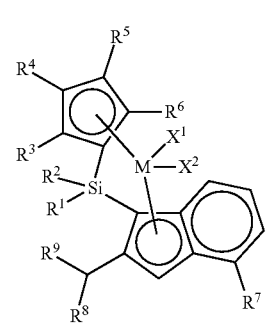

wherein M, $X^1$, $X^2$, $R^1$ to $R^9$ are described herein.

15 Claims, No Drawings

TRANSITION METAL COMPOUND, CATALYST COMPOSITION AND METHOD FOR PREPARING POLYPROPYLENE USING THE SAME

CROSS-REFERENCE TO RELATED APPLICATION(S)

The present application is a national stage entry under 35 U.S.C. § 371 of International Application No. PCT/KR2020/003046 filed on Mar. 4, 2020, which claims priority from Korean Patent Application No. 10-2019-0028866 filed on Mar. 13, 2019, the disclosures of which are incorporated herein by reference in their entirety.

TECHNICAL FIELD

The present disclosure relates to a novel transition metal compound, a catalyst composition, and a method for preparing a polypropylene using the same.

BACKGROUND

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

Recently, due to changes in environmental awareness, it has been attempted to reduce the generation of volatile organic compounds (VOCs) in many products. However, the Ziegler-Natta catalyst (Z/N), which is mainly used in the preparation of a polypropylene, has a problem of generating many VOCs. In particular, various commercially available polypropylene products are mainly prepared using the Ziegler-Natta catalyst, but recently, a conversion to products prepared using the metallocene catalyst having low odor and low elution characteristics has been accelerated.

Accordingly, there is a demand for developing a method for preparing a polypropylene having excellent physical properties using a metallocene-based catalyst.

DETAILED DESCRIPTION OF THE INVENTION

Technical Problem

In the present disclosure, there is provided a novel transition metal compound which exhibits high hydrogen reactivity with excellent catalytic activity for propylene polymerization, and is useful in the preparation of a polypropylene having a narrow molecular weight distribution and a low melting point.

There is also provided a catalyst composition including the transition metal compound.

In addition, there is provided a method for preparing a polypropylene using the catalyst composition.

Technical Solution

In the present disclosure, there is provided a transition metal compound represented by the following Chemical Formula 1.

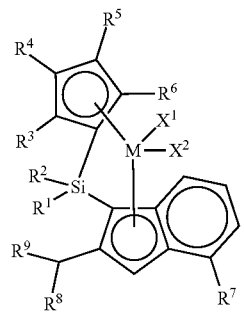

[Chemical Formula 1]

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is $C_{6-20}$ aryl substituted with at least one functional group selected from the group consisting of hydrogen, $C_{1-20}$ alkyl, and $C_{1-20}$ alkylsilyl, and $R^8$ and $R^9$ are the same as or different from each other, and are each independently $C_{1-20}$ alkyl.

In Chemical Formula 1, M may preferably be zirconium (Zr) or hafnium (Hf).

In Chemical Formula 1, each of the $R^1$ and $R^2$ may be $C_{1-8}$ linear or branched alkyl, or $C_{2-12}$ linear or branched alkoxyalkyl. Specifically, it may be methyl, ethyl, propyl, isopropyl, butyl, isobutyl, t-butyl, hexyl, or t-butoxyhexyl.

In Chemical Formula 1, each of the $R^3$ to $R^6$ may be $C_{1-6}$ linear or branched alkyl, or $C_{1-3}$ linear or branched alkyl. Specifically, it may be methyl, ethyl, propyl, or isopropyl, and methyl is preferable.

In Chemical Formula 1, $R^7$ may be phenyl, phenyl substituted with $C_{1-6}$ linear or branched alkyl, phenyl substituted with $C_{1-6}$ linear or branched alkylsilyl, naphthyl, naphthyl substituted with $C_{1-6}$ linear or branched alkyl, or naphthyl substituted with $C_{1-6}$ linear or branched alkylsilyl. Specifically, the phenyl or naphthyl may be the one in which one or two or more of hydrogen substituents are each substituted with $C_{1-6}$ linear or branched alkyl or $C_{1-6}$ linear or branched alkylsilyl. For example, the phenyl or naphthyl may be the one in which one or two or more of hydrogen substituents are each substituted with methyl, ethyl, propyl, isopropyl, butyl, isobutyl, t-butyl, or trimethylsilyl.

In Chemical Formula 1, each of the $R^8$ and $R^9$ may be $C_{1-6}$ linear or branched alkyl, or $C_{1-3}$ linear or branched alkyl. Specifically, it may be methyl, ethyl, or propyl, and methyl is preferable.

In addition, the compound represented by the Chemical Formula 1 may be, for example, represented by the following Chemical Formula 1-1 or Chemical Formula 1-2.

[Chemical Formula 1-1]

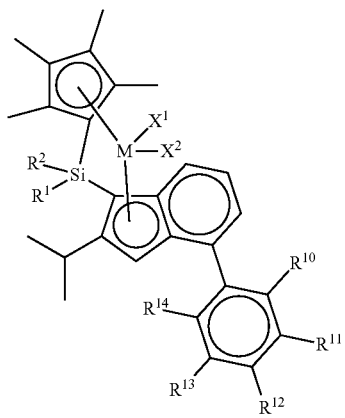

[Chemical Formula 1-2]

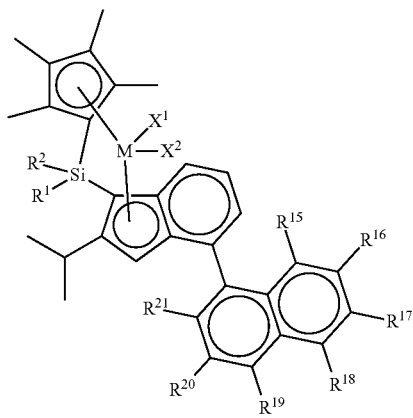

in Chemical Formulae 1-1 and 1-2, M, $X^1$, $X^2$, $R^1$, and $R^2$ are as defined in Chemical Formula 1, and $R^{10}$ to $R^{14}$ and $R^{15}$ to $R^{21}$ are the same as or different from each other, and are each independently selected from the group consisting of hydrogen, $C_{1-20}$ alkyl, and $C_{1-20}$ alkylsilyl.

In Chemical Formulae 1-1 and 1-2, each of the $R^{10}$ to $R^{14}$ and $R^{15}$ to $R^{21}$ may be hydrogen, $C_{1-6}$ linear or branched alkyl, or $C_{1-6}$ linear or branched alkylsilyl. Specifically, it may be methyl, ethyl, propyl, isopropyl, butyl, isobutyl, t-butyl, or trimethylsilyl.

In addition, the compound represented by the Chemical Formula 1 may be, for example, any one of compounds represented by the following structural formulae.

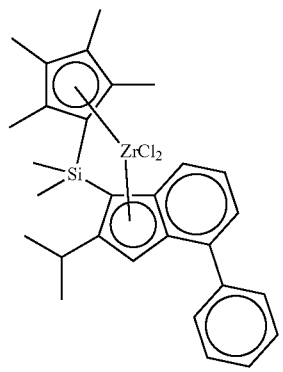

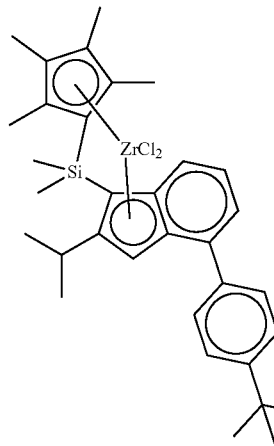

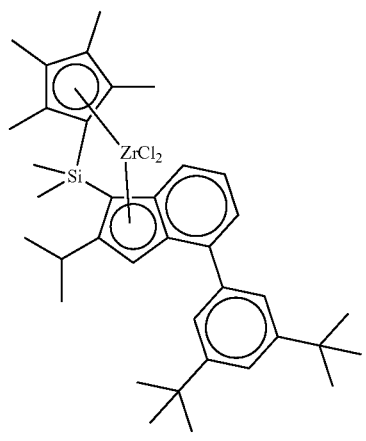

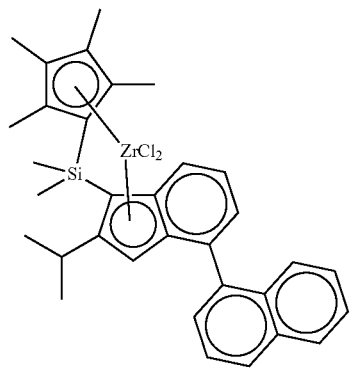

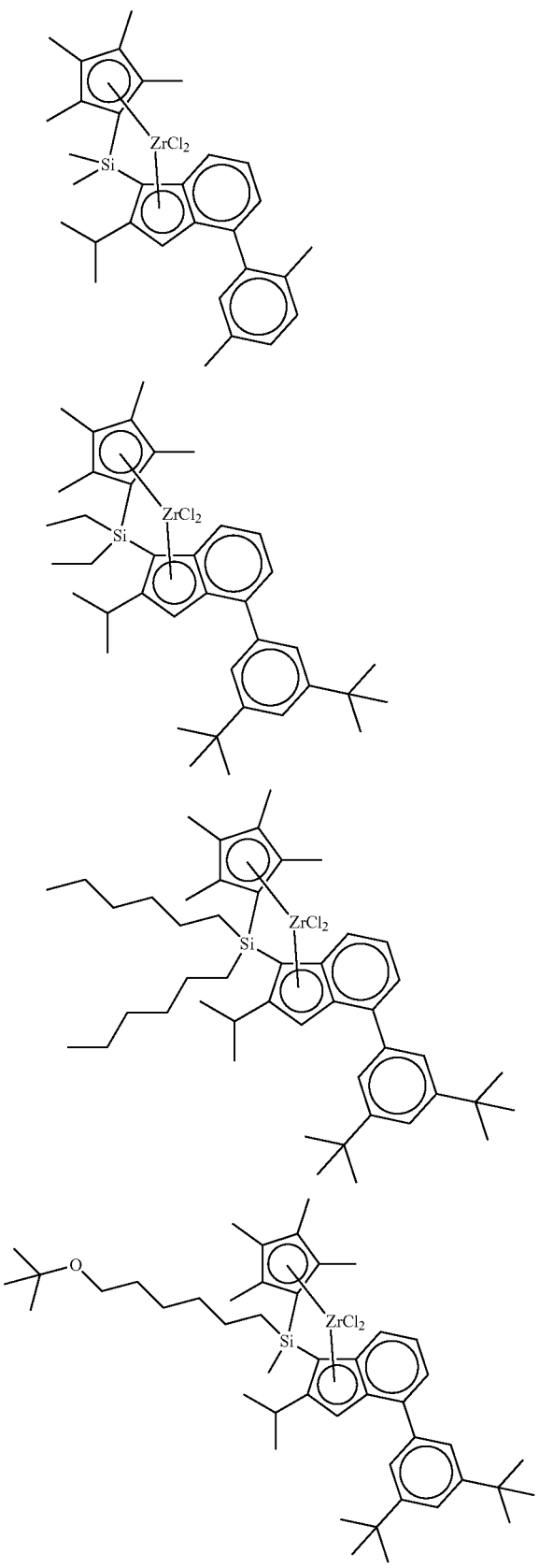
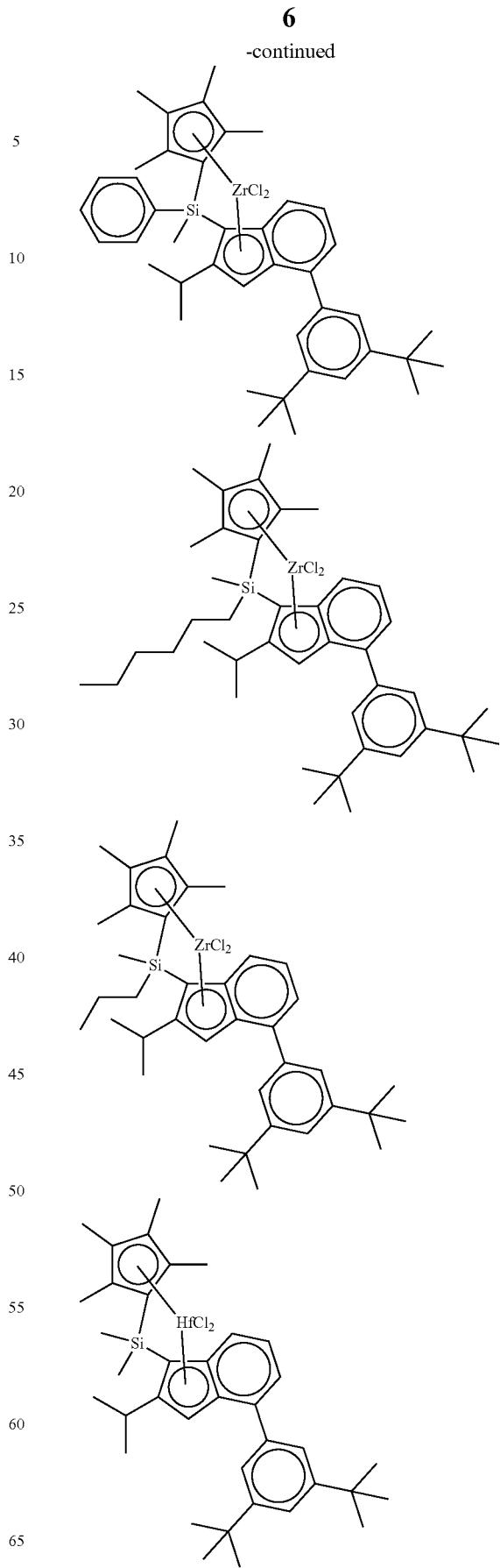

-continued

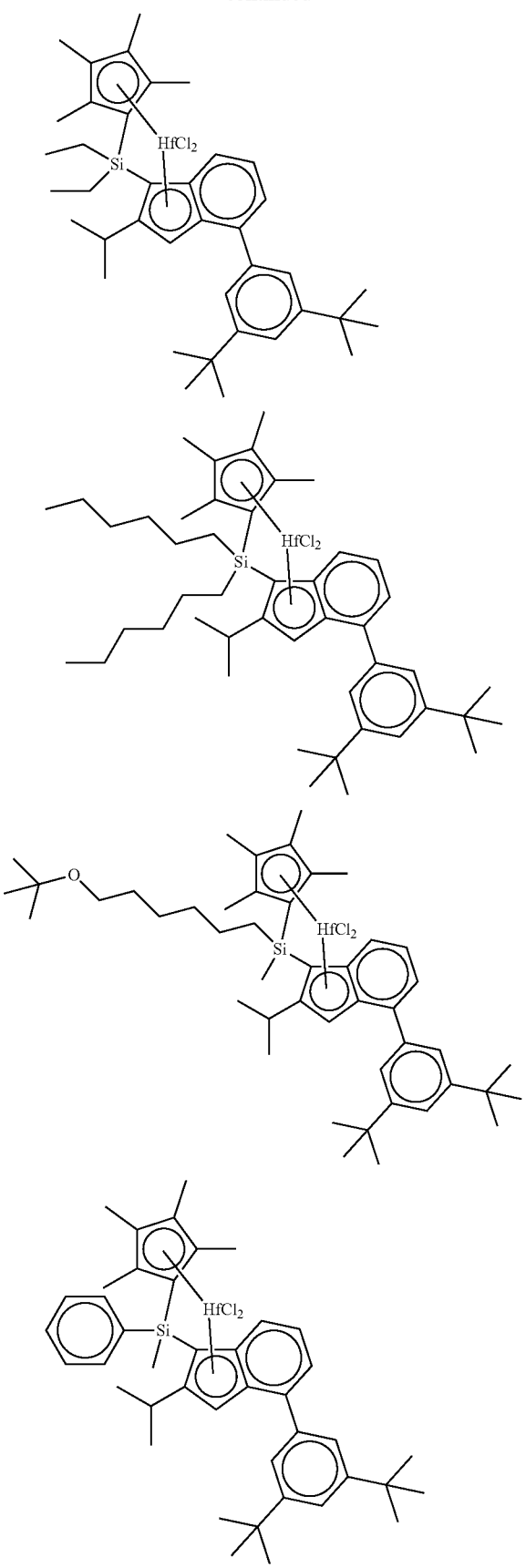

-continued

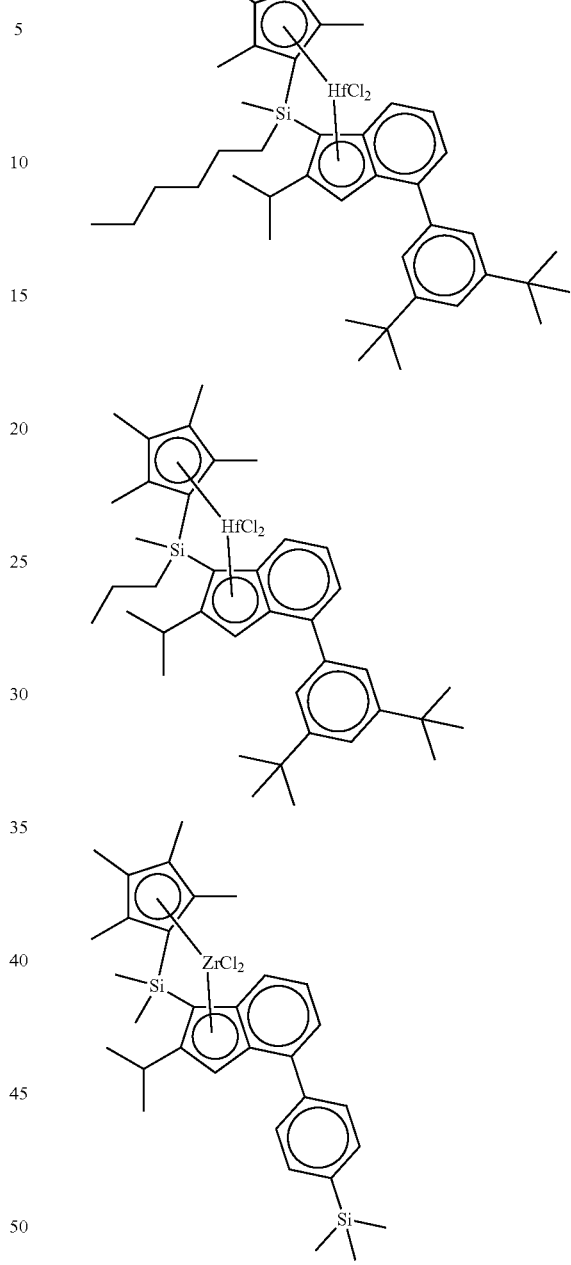

In the present disclosure, there is provided a catalyst composition including the above-described transition metal compound.

At this time, the catalyst composition may include the above transition metal compound and a support, and may be in a form in which the transition metal compound is supported on the support.

Further, the catalyst composition may further include at least one cocatalyst selected from the group consisting of compounds represented by the following Chemical Formulae 2 to 4.

$$—[Al(R^{22})—O]_m—$$ [Chemical Formula 2]

in Chemical Formula 2,
$R^{22}$ are the same as or different from each other, and are each independently halogen, $C_{1-20}$ alkyl, or $C_{1-20}$ haloalkyl; and
m is an integer of 2 or more;

$$J(R^{23})_3 \quad \text{[Chemical Formula 3]}$$

in Chemical Formula 3,
$R^{23}$ are the same as or different from each other, and are each independently halogen, $C_{1-20}$ alkyl, or $C_{1-20}$ haloalkyl; and J is aluminum or boron;

$$[E\text{-}H]^+[ZQ_4]^- \quad \text{[Chemical Formula 4]}$$

in Chemical Formula 4,
E is a neutral or cationic Lewis base;
H is a hydrogen atom;
Z is a group 13 element; and
Q are the same as or different from each other, and each independently $C_{6-20}$ aryl or $C_{1-20}$ alkyl unsubstituted or substituted with a substituent selected from the group consisting of halogen, $C_{1-20}$ alkyl, $C_{1-20}$ alkoxy, and $C_{6-20}$ phenoxy.

In the present disclosure, there is provided a method for preparing a polypropylene, including a step of polymerizing propylene monomers in the presence of the above catalyst composition The polymerization step may be performed while introducing 1500 ppm or less of hydrogen gas based on the propylene monomers.

At this time, the polypropylene to be prepared may be a homopolymer. In addition, the polypropylene may have a molecular weight distribution (Mw/Mn) of about 2.35 or less, or about 2.1 to about 2.35, a melt index ($MI_{2.16}$, measured at 230° C. under a load of 2.16 kg) of about 1000 g/10 min to 1500 g/10 min, and a melting point (Tm) of about 148° C. or less, or about 130° C. to about 148° C.

The terminology used herein is for the purpose of describing particular embodiments only and is not intended to be limiting of the invention.

The singular forms are intended to include the plural forms as well, unless the context clearly indicates otherwise.

It will be further understood that the terms "include", "have", or "possess" specify the presence of stated features, numbers, steps, components, or combinations thereof, but do not preclude the presence or addition of one or more other features, numbers, steps, components, or combinations thereof.

Also, as used herein, in case a layer or an element is mentioned to be formed "on" layers or elements, it means that the layer or element is directly formed on the layers or elements, or it means that other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to an aspect of the present invention, there is provided a transition metal compound represented by the following Chemical Formula 1.

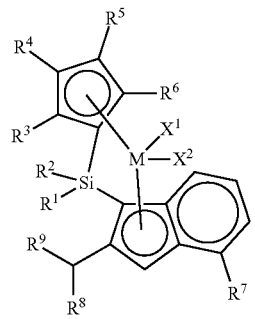

[Chemical Formula 1]

in Chemical Formula 1,
M is a Group 4 transition metal,
$X^1$ and $X^2$ are the same as or different from each other, and are each independently halogen,
$R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl,
$R^3$ to $R^6$ are the same as or different from each other, and are each independently $C_{1-20}$ alkyl,
$R^7$ is $C_{6-20}$ aryl substituted with at least one functional group selected from the group consisting of hydrogen, $C_{1-20}$ alkyl, and $C_{1-20}$ alkylsilyl, and
$R^8$ and $R^9$ are the same as or different from each other, and are each independently $C_{1-20}$ alkyl.

Unless otherwise specified herein, following terms may be defined as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_1$-20 alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, or the like, but is not limited thereto.

The $C_{2-20}$ alkenyl may be linear, branched, or cyclic alkenyl. Specifically, it may be allyl, ethenyl, propenyl, butenyl, pentenyl, or the like, but is not limited thereto.

The $C_{1-20}$ alkoxy may be methoxy, ethoxy, isopropoxy, n-butoxy, tert-butoxy, phenyloxy, cyclohexyloxy, or the like, but is not limited thereto.

The $C_{2-20}$ alkoxyalkyl group is a functional group in which at least one hydrogen of the above-mentioned alkyl is substituted with alkoxy, and it may be alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, and tert-butoxyhexyl; aryloxyalkyl such as phenoxyhexyl; or the like, but is not limited thereto.

The $C_{1-20}$ alkylsilyl or the $C_{1-20}$ alkoxysilyl is a functional group in which 1 to 3 hydrogens of —$SiH_3$ are substituted with 1 to 3 alkyl groups or alkoxy groups described above, and it may be alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; or the like, but is not limited thereto.

The $C_{1-20}$ silylalkyl is a functional group in which at least one hydrogen of the above-mentioned alkyl is substituted with silyl, and it may be —$CH_2$—$SiH_3$, methylsilylmethyl or dimethylethoxysilylpropyl, or the like, but is not limited thereto.

In addition, the $C_{1-20}$ alkylene is the same as the above-mentioned alkyl except that it is a divalent substituent, and it may be methylene, ethylene, propylene, butylene, pentylene, hexylene, heptylene, octylene, cyclopropylene, cyclobutylene, cyclopentylene, cyclohexylene, cycloheptylene, cyclooctylene, or the like, but is not limited thereto.

The $C_{6-20}$ aryl may be a monocyclic, bicyclic or tricyclic aromatic hydrocarbon. For example, the $C_{6-20}$ aryl may be phenyl, biphenyl, naphthyl, anthracenyl, phenanthrenyl, fluorenyl, or the like, but is not limited thereto.

The $C_{7-20}$ alkylaryl may refer to a substituent in which at least one hydrogen of the aromatic ring is substituted with the above-mentioned alkyl. For example, the $C_{7-20}$ alkylaryl may be methylphenyl, ethylphenyl, methylbiphenyl, methylnaphthyl, or the like, but is not limited thereto.

The $C_{7-20}$ arylalkyl may refer to a substituent in which at least one hydrogen of the alkyl is substituted with the above-mentioned aryl. For example, the $C_{7-20}$ arylalkyl may be phenylmethyl, phenylethyl, biphenylmethyl, naphthylmethyl, or the like, but is not limited thereto.

In addition, the $C_{6-20}$ arylene is the same as the above-mentioned aryl except that it is a divalent substituent, and it may be phenylene, biphenylene, naphthylene, anthracenylene, phenanthrenylene, fluorenylene, or the like, but is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

Meanwhile, the transition metal compound of the present disclosure has an asymmetric structure in which cyclopentadienyl-based groups different from each other are linked by a bridge as a ligand as shown in Chemical Formula 1 above.

Specifically, in Chemical Formula 1, a cyclopentadienyl group substituted with an alkyl group is linked to a bridge on the upper part of the ligand, and an indenyl structure having a specific substituent is linked to the bridge on the lower part of the ligand.

According to the specific structure described above, the transition metal compound may have various characteristics of the two different cyclopentadienyl-based rings or may selectively take the advantages, thereby exhibiting better catalytic activity.

Specifically, as a hydrogen functional group is substituted with an alkyl group in the cyclopentadienyl structure of the ligand of Chemical Formula 1, the cyclopentadienyl structure plays an important role in maintaining tacticity which is important for propylene polymerization. The presence of a bulky structure induces —$CH_3$ branches of propylene to one side, allowing an isotactic polymer to grow. In the case of cyclopentadienyl (Cp) which is substituted only with hydrogen, there is no bulky portion. Thus, when the propylene is inserted, the catalyst faces in a completely open state, so that the tacticity collapses to form atactic PP.

In addition, when propylene ($C_3$) and $H_2$ are reacted together, the reaction occurs competitively. When a bulky structure is substituted at position 2 in the indenyl structure of the ligand of Chemical Formula 1, for example, when $R^8$ to $R^9$ are substituted with $C_{1-20}$ alkyl, a specific steric arrangement is given to the metal center, and thus, reactivity of $H_2$, which is smaller than $C_3$, is improved. Accordingly, when a bulky structure, in which $R^8$ to $R^9$ are substituted with $C_{1-20}$ alkyl, such as isopropyl is substituted at an indene position, hydrogen reactivity can be increased in the polymerization process.

In addition, an aryl substituent capable of giving electrons abundantly is substituted at position 4 in the indenyl structure, and thus electrons are abundantly given to a metal atom included in the bridge structure of Chemical Formula 1, resulting in higher catalytic activity. Herein, an example of the aryl substituent may be a $C_{6-20}$ aryl substituent in which $R^7$ is $C_{6-20}$ aryl substituted with at least one functional group of hydrogen, $C_{1-20}$ alkyl, and $C_{1-20}$ alkylsilyl.

In addition, as the above-mentioned transition metal compound is in a form where two ligands are linked by a bridge group and provides electrons to the transition metal, it may have high structural stability and high polymerization activity even when supported on a support.

In Chemical Formula 1, M may preferably be zirconium (Zr) or hafnium (Hf).

In addition, in Chemical Formula 1, each of the $R^1$ and $R^2$ may be $C_{1-8}$ linear or branched alkyl, $C_{2-12}$ linear or branched alkoxyalkyl, or $C_{6-12}$ aryl. Specifically, it may be methyl, ethyl, propyl, isopropyl, butyl, isobutyl, tert-butyl, hexyl, tert-butoxyhexyl, or phenyl.

In addition, in Chemical Formula 1, each of the $R^3$ to $R^6$ may be $C_{1-6}$ linear or branched alkyl, or $C_{1-3}$ linear or branched alkyl. Specifically, it may be methyl, ethyl, propyl, or isopropyl, and methyl is preferable.

In addition, in Chemical Formula 1, $R^7$ may be phenyl, phenyl substituted with $C_{1-6}$ linear or branched alkyl, phenyl substituted with $C_{1-6}$ linear or branched alkylsilyl, naphthyl, naphthyl substituted with $C_{1-6}$ linear or branched alkyl, or naphthyl substituted with $C_{1-6}$ linear or branched alkylsilyl. Specifically, the phenyl or naphthyl may be the one in which one or two or more of hydrogen substituents are each substituted with $C_{1-6}$ linear or branched alkyl or $C_{1-6}$ linear or branched alkylsilyl. For example, the phenyl or naphthyl may be the one in which one or two or more of hydrogen substituents are each substituted with methyl, ethyl, propyl, isopropyl, butyl, isobutyl, tert-butyl, or trimethylsilyl.

The substituent at each position of the aromatic group can supply sufficient electrons to the aromatic group by an inductive effect, and increase the overall size of the transition metal compound. Moreover, an available angle may be increased and monomers may be easily accessed, thereby exhibiting better catalytic activity.

In Chemical Formula 1, each of the $R^8$ and $R^9$ may be $C_{1-6}$ linear or branched alkyl, or $C_{1-3}$ linear or branched alkyl. Specifically, it may be methyl, ethyl, or propyl, and methyl is preferable.

In addition, the compound represented by the Chemical Formula 1 may be, for example, represented by the following Chemical Formula 1-1 or Chemical Formula 1-2.

[Chemical Formula 1-1]

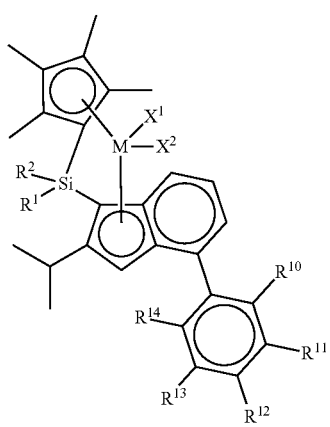

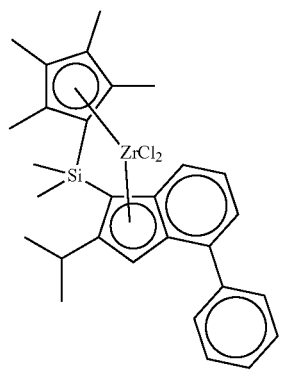

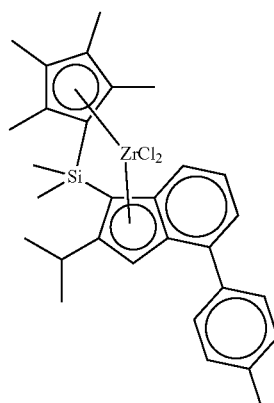

[Chemical Formula 1-2]

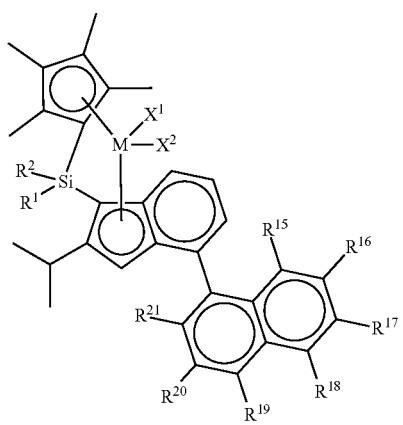

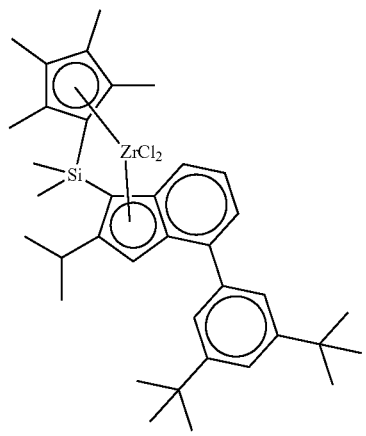

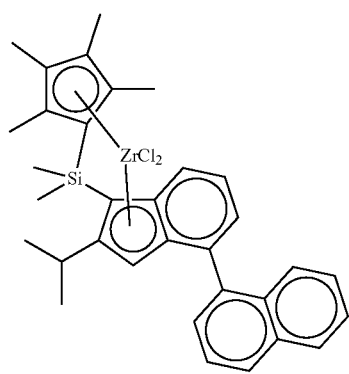

in Chemical Formulae 1-1 and 1-2, M, $X^1$, $X^2$, $R^1$, and $R^2$ are as defined in Chemical Formula 1, and $R^{10}$ to $R^{14}$ and $R^{15}$ to $R^{21}$ are the same as or different from each other, and are each independently selected from the group consisting of hydrogen, $C_{1-20}$ alkyl, and $C_{1-20}$ alkylsilyl.

In Chemical Formulae 1-1 and 1-2, each of the $R^{10}$ to $R^{14}$ and $R^{15}$ to $R^{21}$ may be hydrogen, $C_{1-6}$ linear or branched alkyl, or $C_{1-6}$ linear or branched alkylsilyl. Specifically, all of the $R^{10}$ to $R^{14}$ and $R^{15}$ to $R^{21}$ may be hydrogen, or one or two or more of $R^{10}$ to $R^{14}$ and $R^{15}$ to $R^{21}$ may be $C_{1-6}$ linear or branched alkyl, or $C_{1-6}$ linear or branched alkylsilyl. For example, one or two or more of hydrogen substituents of $R^{10}$ to $R^{14}$ and $R^{15}$ to $R^{21}$ may be methyl, ethyl, propyl, isopropyl, butyl, isobutyl, or tert-butyl.

In addition, the compound represented by the Chemical Formula 1 may be, for example, any one of compounds represented by the following structural formulae.

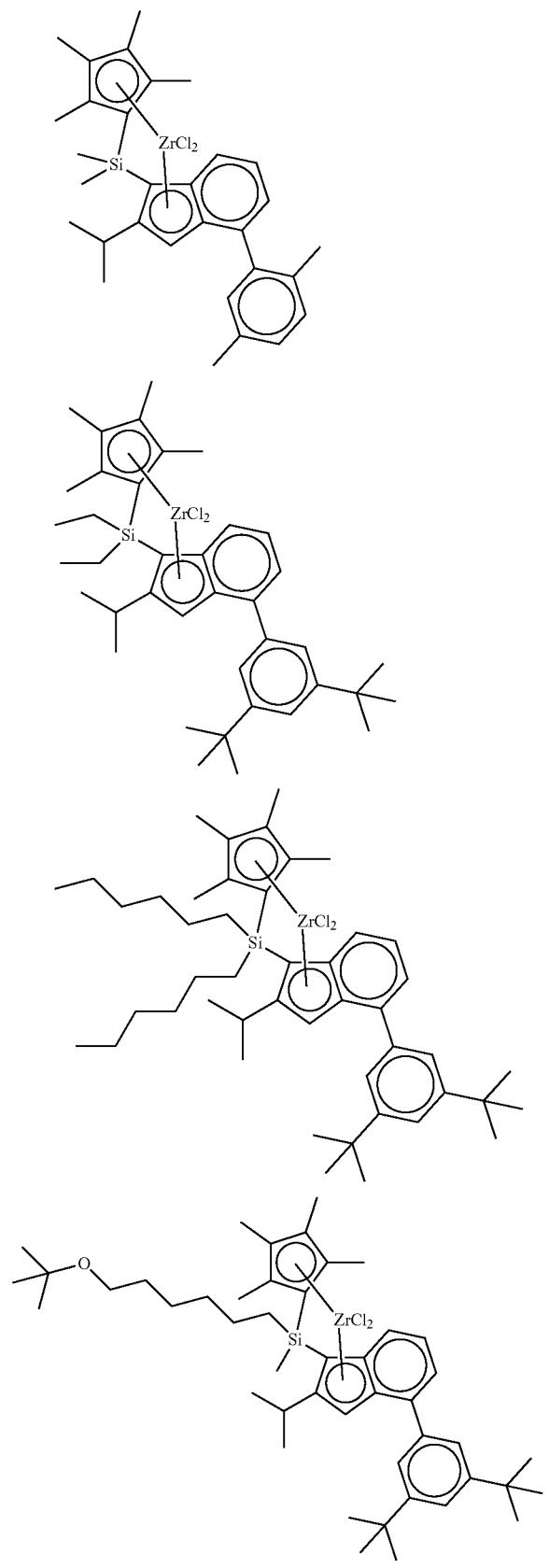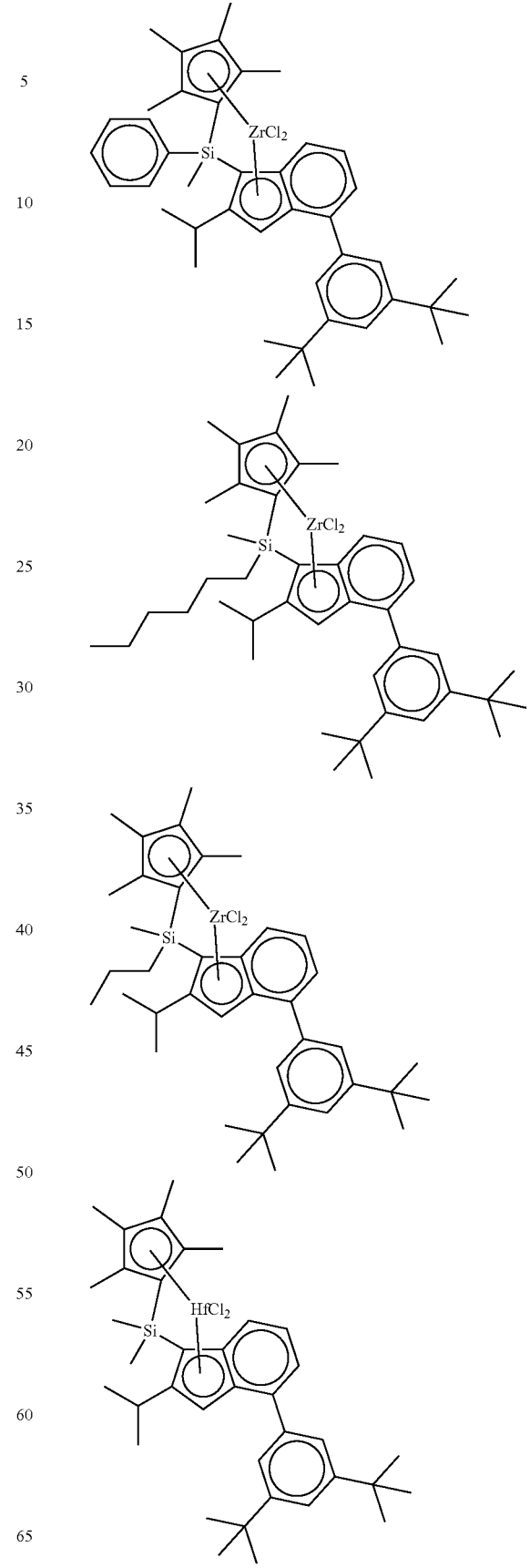

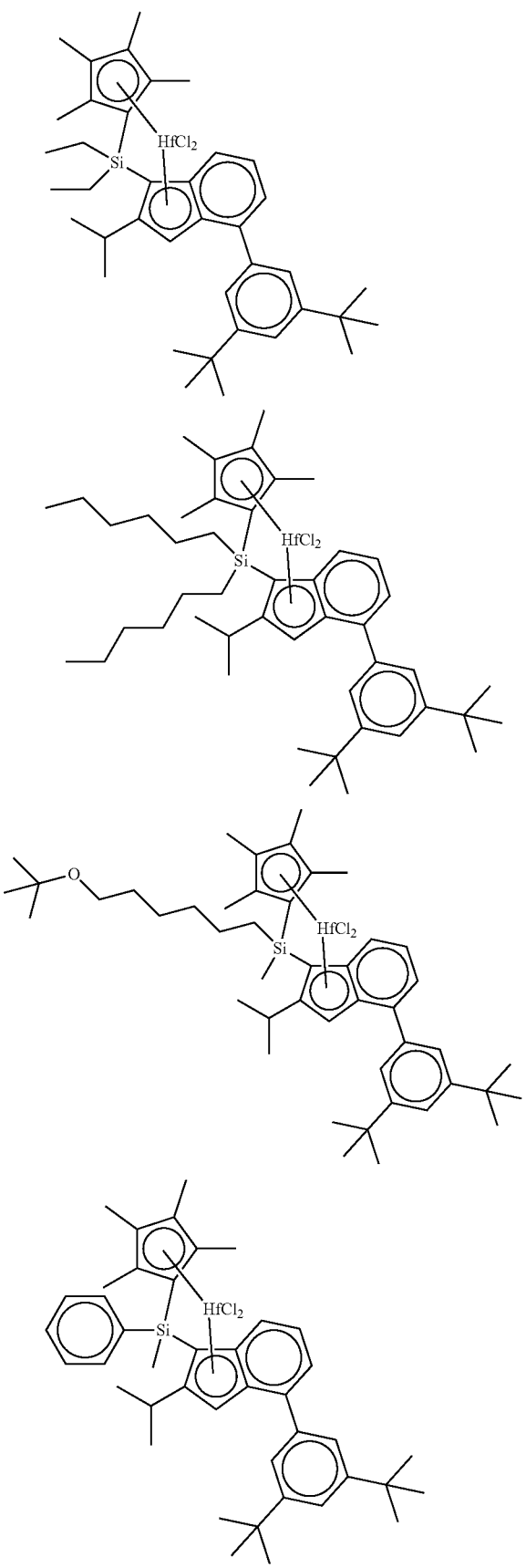

In addition, a series of reactions for preparing the ligand compound and the transition metal compound are as in Reaction Formula 1 below. However, the following Reaction Formula 1 is an example for illustrating the present disclosure, and the present disclosure is not limited thereto.

Referring to the following Reaction Formula 1, the transition metal compound of Chemical Formula 1 according to an embodiment of the present disclosure may be prepared by a method including the steps of: reacting a cyclopentadienyl compound (compound 1) in which $R^3$ to $R^6$ are substituted with a halogenated silane compound (Silane) in which $R^1$ and $R^2$ are substituted to prepare a cyclopentadienyl compound (compound 2) to which a silicon bridge group is linked (Step 1); reacting the cyclopentadienyl compound (compound 2) to which a silicon bridge group is linked with an indene compound in which $R^7$, $R^8$, and $R^9$ are substituted to prepare a ligand compound (compound 3) in which cyclopentadienyl and indenyl are linked by a silicone bridge group (Step 2); and reacting the ligand compound (compound 3) with a metal halide of a group 4 transition metal in which the group 4 transition metal M is substituted with halogen elements $X^1$ and $X^2$ to prepare a transition metal compound (compound 4) of Chemical Formula 1 (Step 3).

[Reaction Formula 1]

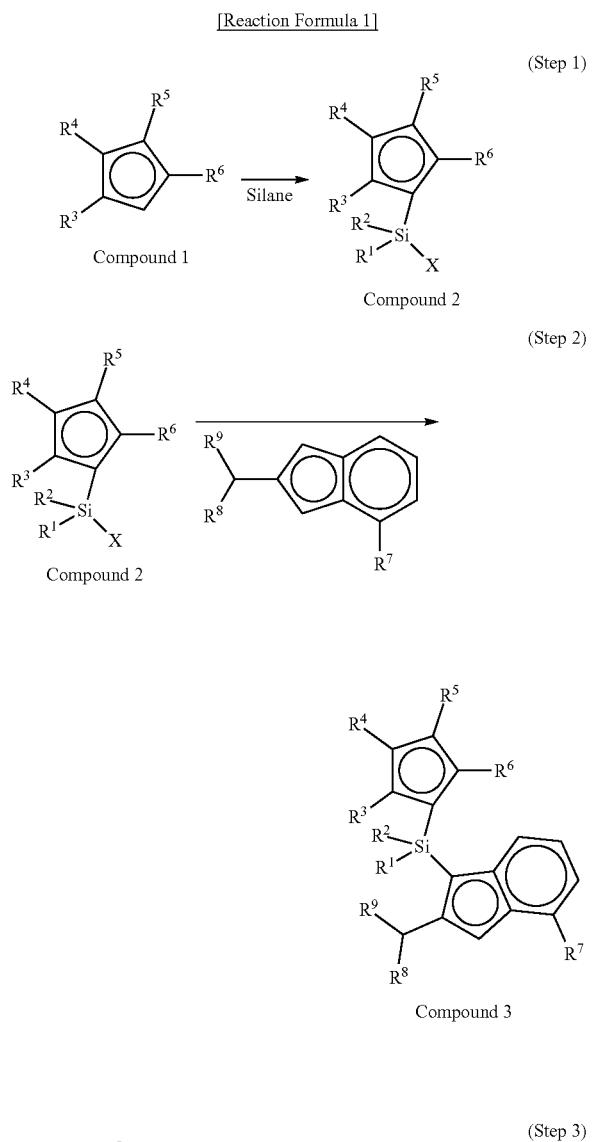

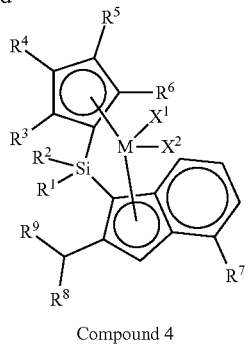

Compound 4

In the Reaction Formula 1, each substituent group is as defined above, and X is a halogen element. Each reaction of the above steps may be carried out by applying known reactions, and a more detailed synthesis method may be referred to the following Preparation Examples.

Specifically, the transition metal compound according to an embodiment of the present disclosure may be prepared by a method including the steps of: reacting a precursor compound (compound 1) such as tetramethylcyclopentadienyl with a compound providing a bridge group such as halogenated silane (Silane) in the presence of alkyl lithium such as butyl lithium (n-BuLi) to prepare a silicon bridge-linked cyclopentadienyl compound (compound 2) (Step 1); reacting the silicon bridge-linked cyclopentadienyl compound (compound 2) with an indene compound in which positions 2 and 4 are substituted with a specific substituent of $R^8$, $R^9$ and $R^7$, respectively, in the presence of alkyllithium such as butyl lithium (n-BuLi) and CuCN to prepare a ligand compound (compound 3) in which cyclopentadienyl and indenyl are linked by a silicon bridge group (Step 2); and reacting the ligand compound (compound 3) with a metal halide of a Group 4 transition metal such as $ZrCl_4$ to prepare a transition metal compound (compound 4) of Chemical Formula 1 (Step 3).

In the method for preparing the transition metal compound of the present disclosure, the equivalent weight (eq) refers to a molar equivalent weight (eq/mol).

According to another embodiment of the present disclosure, there is provided a catalyst composition including the above-described transition metal compound.

Specifically, the catalyst composition according to an embodiment of the present disclosure includes the transition metal compound of Chemical Formula 1 as a single catalyst.

Herein, the above catalyst composition may include the transition metal compound as a single component or may be in a form of a supported catalyst including the transition metal compound and a support. When using a supported metallocene catalyst, the polypropylene to be prepared has excellent morphology and physical properties, and the catalyst may be suitably used for slurry polymerization, bulk polymerization, and gas phase polymerization.

Specifically, the support may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at a high temperature, silica-alumina, or silica-magnesia, and it may usually contain oxides, carbonates, sulfates, or nitrates such as $Na_2O$, $K_2CO_3$, $BaSO_4$, $Mg(NO_3)_2$ and the like.

The support is preferably calcined or dried at about 200° C. to about 700° C., more preferably about 250° C. to about 650° C. When the temperature is too low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is too high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

For example, the amount of hydroxyl groups on the surface may be 0.1 to 10 mmol/g, or 0.5 to 5 mmol/g. The amount of hydroxy groups may be controlled by the preparation method, the preparation conditions, or the drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the propylene, because the compound of Chemical Formula 1 is chemically bonded to and supported on the silica support. As a result, when the polypropylene is prepared by slurry polymerization or gas phase polymerization, a fouling phenomenon, sticking to the wall surface of the reactor or with each other, may be minimized.

When supported on a support, the content of the compound of Chemical Formula 1 may be, for example, about 10 µmol or more, or about 30 µmol or more, and about 100 µmol or less, or about 80 µmol or less based on a weight of the support, for example, 1 g of silica. When supported within the above content range, the supported catalyst may exhibit appropriate activity, which is advantageous in terms of maintaining catalytic activity and economical efficiency.

In addition, the above catalyst composition may further include a cocatalyst in addition to the transition metal compound and the support.

Specifically, the cocatalyst may include at least one compound represented by the following Chemical Formula 2.

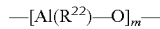  [Chemical Formula 2]

in Chemical Formula 2, $R^{22}$ are the same as or different from each other, and are each independently halogen, $C_{1-20}$ alkyl, or $C_{1-20}$ haloalkyl; and m is an integer of 2 or more.

Examples of the compound represented by Chemical Formula 2 may include an alkylaluminoxane-based compound such as methylaluminoxane, ethylaluminoxane, isobutylaluminoxane, butylaluminoxane, and the like, and any one or a mixture thereof may be used.

In addition, the cocatalyst may include at least one compound represented by the following Chemical Formula 3.

  [Chemical Formula 3]

in Chemical Formula 3, $R^{23}$ are the same as or different from each other, and are each independently halogen, $C_{1-20}$ alkyl, or $C_{1-20}$ haloalkyl; and J is aluminum or boron.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and a more preferred compound is selected from trimethylaluminum, triethylaluminum, and triisobutylaluminum.

In addition, the cocatalyst may include at least one compound represented by the following Chemical Formula 4.

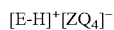  [Chemical Formula 4]

in Chemical Formula 4,

E is a neutral or cationic Lewis base;

H is a hydrogen atom;

Z is a group 13 element; and

Q are the same as or different from each other, and are each independently $C_{6-20}$ aryl or $C_{1-20}$ alkyl unsubstituted or substituted with a substituent selected from the group consisting of halogen, $C_{1-20}$ alkyl, $C_{1-20}$ alkoxy, and $C_{6-20}$ phenoxy.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N, N-diethylanilinium tetraphenylaluminum, N, N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

In order to exhibit better catalytic activity when used with the compound of Chemical Formula 1, the cocatalyst may preferably be the compound represented by the Chemical Formula 2. More specifically, the alkylaluminoxane-based compound such as methylaluminoxane may be further used as the cocatalyst. The alkylaluminoxane-based cocatalyst acts as a scavenger of a hydroxyl group present on the surface of the support to improve the catalytic activity and to convert the halogen group of the catalyst precursor to a methyl group, thereby promoting chain growth in the polymerization of a polypropylene.

The cocatalyst may be supported in an amount of about 3 mmol or more, or about 5 mmol or more, and about 20 mmol or less, or about 15 mmol or less based on a weight of the support, for example, 1 g of silica. When supported within the above content range, it is possible to obtain an effect of improving catalytic activity.

According to another embodiment of the present disclosure, there is provided a method for preparing a polypropylene, including a step of polymerizing propylene monomers in the presence of the above-described catalyst composition.

The polymerization reaction may be performed by homopolymerizing propylene using a continuous slurry polymerization reactor, a loop slurry reactor, a gas phase reactor, or a solution reactor.

In addition, the polymerization may be performed at a temperature of about 25° C. to about 500° C., preferably about 25° C. to about 200° C., more preferably about 50° C. to about 150° C. In addition, the polymerization may be performed at a pressure of about 1 kgf/cm$^2$ to about 100 kgf/cm$^2$, preferably about 1 kgf/cm$^2$ to about 50 kgf/cm$^2$, more preferably about 5 kgf/cm$^2$ to about 30 kgf/cm$^2$.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

In particular, when the transition metal compound according to the present disclosure is used as a polymerization catalyst for preparing a polypropylene, hydrogen reactivity is improved along with excellent catalytic activity, and a high melt index (high MI) product, for example, a product with a melt index (MI$_{2.16}$, measured at 230° C. under a load of 2.16 kg) of about 1000 g/10 min or more, or about 1100 g/10 min or more, can be produced even with a small amount of hydrogen input. In general, a lot of hydrogen gas (H$_2$) has to be introduced in order to obtain a high melt index (High MI) product. However, since the transition metal compound of the present disclosure has good hydrogen reactivity, it is possible to adjust the desired molecular weight even when less H$_2$ is introduced, which is advantageous in terms of process stability as well as costs.

For example, the polymerization step may be performed while introducing about 1500 ppm or less or about 200 ppm to about 1500 ppm, about 1000 ppm or less or about 250 ppm to about 1000 ppm, or about 700 ppm or less or about 300 ppm to about 700 ppm of hydrogen gas based on the propylene monomers.

In addition, the polymerization step may be a homopolymerization reaction in which the propylene monomers are polymerized alone.

As described above, the polypropylene according to the present disclosure may be prepared by polymerizing propylene using the above-mentioned supported metallocene catalyst.

At this time, the polypropylene to be prepared may be a homopolymer.

In addition, the molecular weight distribution (Mw/Mn) of the polypropylene may be about 2.35 or less or about 2.1 to about 2.35, or about 2.3 or less or about 2.1 to about 2.3.

For example, the molecular weight distribution (Mw/Mn) of the polypropylene can be determined by measuring a weight average molecular weight (Mw) and a number average molecular weight (Mn) using gel permeation chromatography (GPC, manufactured by Water), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polypropylene sample may be pretreated by dissolving in 1,2,4-trichlorobenzene containing 0.0125% of BHT at 160° C. for 10 hours using a GPC analyzer (PL-GP220), and the sample with a concentration of 10 mg/10 mL may be supplied in an amount of 200 μL. Mw and Mn may be obtained using a calibration curve formed using a polystyrene standard. 9 kinds of the polystyrene standard may be used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

In addition, the polypropylene may have a melt index (MI$_{2.16}$) of about 1000 g/10 min to about 1500 g/10 min, or about 1100 g/10 min to about 1450 g/10 min, when measured at 230° C. under a load of 2.16 kg according to the American Society for Testing and Materials ASTM D 1238.

The melting point (Tm) of the polypropylene may be about 148° C. or less or about 130° C. to about 148° C., or about 145° C. or less or about 133° C. to about 145° C.

For example, the melting point may be measured using differential scanning calorimeter (DSC 2920, manufactured by TA instrument). Specifically, the temperature of the polypropylene polymer is increased to 220° C., and maintained at that temperature for 5 minutes. After that, the temperature is lowered to 20° C., and further increased. The temperature at the top of the DSC (Differential Scanning calorimeter, manufactured by TA) curve is referred to as the melting point. Herein, the temperature is increased and lowered at a rate of 10° C./min, respectively, and the melting point is confirmed at the second heating period.

The polypropylene of the present disclosure, as described above, can achieve a high melt index, a narrow molecular weight distribution, and a low melting point at the same time even with a small amount of hydrogen in the polymerization process by using the transition metal compound having a specific substituent and structure as a catalyst.

The polypropylene having these properties can achieve a narrow molecular weight distribution of about 2.35 or less or about 2.3 or less in a high melt index product, and thus it is possible to produce a polypropylene resin suitable for multifilaments fibers produced by high-speed spinning. In addition, although the polypropylene is a homopolymer, it is possible to achieve a low melting point (Tm) of about 148° C. or less, or about 145° C. or less. Therefore, when manufacturing a fiber, there is an advantage that softness similar to that of applying a propylene copolymer such as a propylene random copolymer product can be achieved.

Advantageous Effects

When the transition metal compound according to the present disclosure is used as a polymerization catalyst for preparing a polypropylene, hydrogen reactivity is improved along with excellent catalytic activity, and a high melt index product having a melt index ($MI_{2.16}$, measured at 230° C. under a load of 2.16 kg) of about 1000 g/10 min or more can be produced even with a small amount of hydrogen input. In addition, as the hydrogen input is reduced when manufacturing the high melt index product, costs are significantly reduced, and there is an excellent effect of improving overall process stability.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Examples

<Preparation of Transition Metal Compound>

Example 1

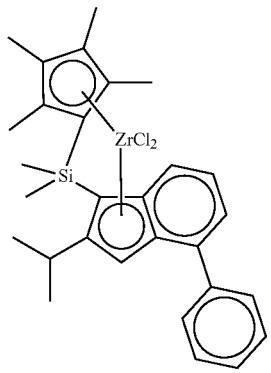

Preparation of Ligand Compound
2,3,4,5-tetramethylcyclopentadienyl Dimethyl (2-isopropyl-4-phenyl) Indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-phenyl)indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound
2,3,4,5-tetramethylcyclopentadienyl Dimethylsilyl (2-isopropyl-4-phenyl)indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.21 (6H, s), 0.86 (6H, d), 1.79 (6H, s), 2.12 (6H, s), 2.39 (1H, m), 6.36 (1H, s), 7.41-7.51 (7H, m), 8.29 (1H, m).

Example 2

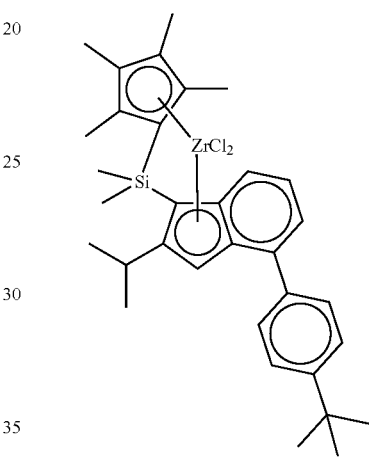

Preparation of Ligand Compound
2,3,4,5-tetramethylcyclopentadienyl Dimethyl (2-isopropyl-4-(4'-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-(4'-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound
2,3,4,5-tetramethylcyclopentadienyl Dimethylsilyl (2-isopropyl-4-(4'-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

¹H-NMR (500 MHz, CDCl₃): 0.21 (6H, s), 0.86 (6H, d), 1.33 (9H, s), 1.79 (6H, s), 2.12 (6H, s), 2.39 (1H, m), 6.36 (1H, s), 7.30 (2H, d), 7.38-7.49 (4H, m), 8.29 (1H, m).

Example 3

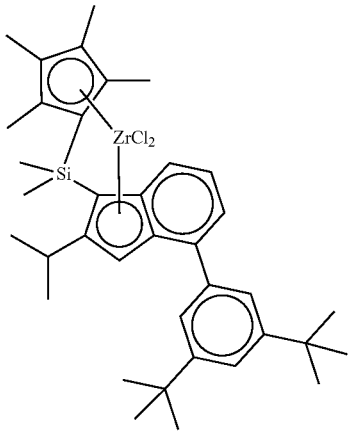

Preparation of ligand compound 2,3,4,5-tetramethylcyclopentadienyl dimethyl (2-isopropyl-4-(3',5'-di-tert-butylphenyl))indenyl silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-(3',5'-di-tert-butylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

¹H-NMR (500 MHz, CDCl₃): 0.21 (6H, s), 0.86 (6H, d), 1.32 (18H, s), 1.79 (6H, s), 2.12 (6H, s), 2.39 (1H, m), 6.36 (1H, s), 7.42-7.49 (2H, m), 7.73 (2H, s), 8.29 (1H, m).

Example 4

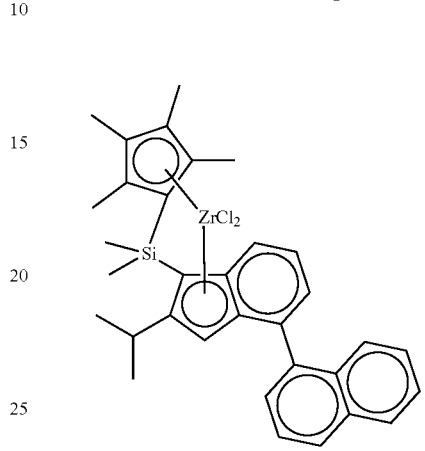

Preparation of Ligand Compound 2,3,4,5-tetramethylcyclopentadienyl Dimethyl (2-isopropyl-4-naphthyl)indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-naphthyl)indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-isopropyl-4-naphthyl)indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

¹H-NMR (500 MHz, CDCl₃): 0.21 (6H, s), 0.86 (6H, d), 1.79 (6H, s), 2.12 (6H, s), 2.39 (1H, m), 6.36 (1H, s), 6.36-7.46 (4H, m), 7.77 (1H, t), 8.09 (1H, m), 8.20 (1H, d), 8.29 (1H, d), 8.50 (1H, d), 8.95 (1H, d).

Example 5

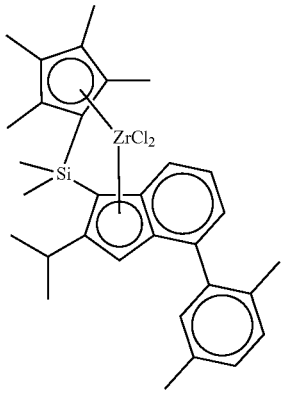

Preparation of Ligand Compound 2,3,4,5-tetramethylcyclopentadienyl Dimethyl (2-isopropyl-4-(2,5-dimethylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-(2,5-dimethylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-isopropyl-4-(2,5-dimethylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

¹H-NMR (500 MHz, CDCl₃): 0.21 (6H, s), 0.86 (6H, d), 1.79 (6H, s), 2.12 (6H, s), 2.33 (3H, s), 2.39 (1H, m), 2.46 (3H, s), 6.36 (1H, s), 7.11 (1H, d), 7.30 (1H, d), 7.42-7.49 (2H, m), 7.73 (1H, s), 8.29 (1H, d).

Example 6

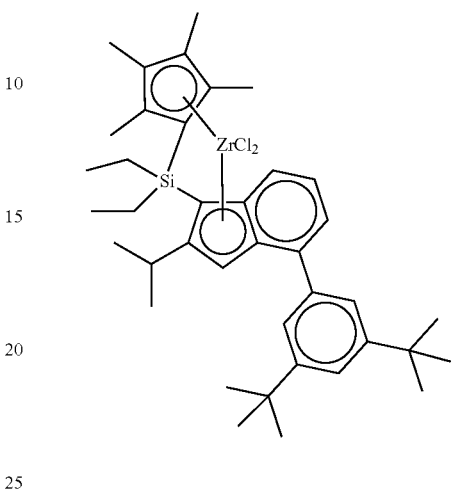

Preparation of Ligand Compound 2,3,4,5-tetramethylcyclopentadienyl Diethyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, diethylsilane (Silane, 1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Diethylsilyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl₄ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

¹H-NMR (500 MHz, CDCl₃):0.66 (4H, q), 0.86 (6H, d), 0.94 (6H, t), 1.32 (18H, s), 1.79 (6H, s), 2.12 (6H, s), 2.39 (1H, m), 6.36 (1H, s), 7.42-7.49 (2H, m), 7.73 (2H, s), 8.29 (1H, d).

Example 7

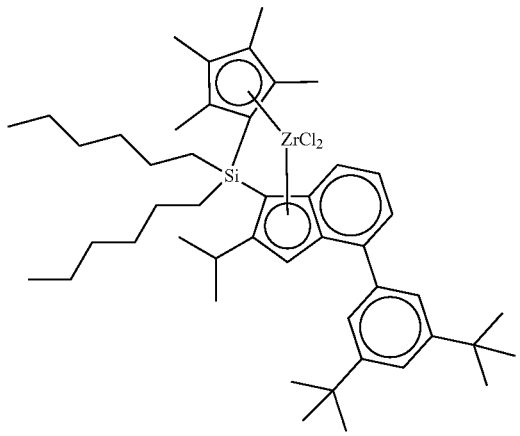

Preparation of Ligand Compound 2,3,4,5-tetramethylcyclopentadienyl Dihexyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dihexylsilane (Silane, 1.05 eq) was added thereto at −10° C., and stirred overnight at room temperature. In another reactor, (2-isopropyl-4-(3',5-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dihexylsilyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.60 (4H, t), 0.86 (6H, d), 0.88 (6H, t), 1.23-1.28 (16H, m), 1.32 (18H, s), 1.79 (6H, s), 2.12 (6H, s), 2.39 (1H, m), 6.36 (1H, s), 7.42-7.50 (2H, m), 7.73 (2H, s), 8.25 (1H, d).

Example 8

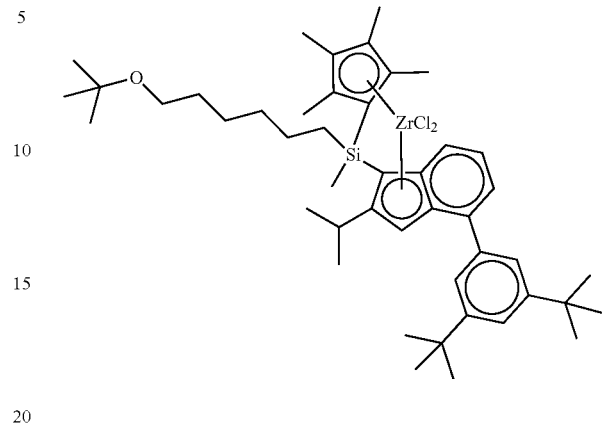

Preparation of Ligand Compound 2,3,4,5-tetramethylcyclopentadienyl 6-(tert-butoxy)hexyl)methyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, 6-(tert-butoxy)hexyl)methyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl 6-(tert-butoxy)hexyl)methylsilyl (2-isopropyl-4-(3',5'-di-tertbutylphenyl)) indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.19 (3H, s), 0.62 (2H, t), 0.84 (6H, d), 1.29-1.31 (4H, m), 1.35 (18H, s), 1.43 (2H, t), 1.50 (2H, t), 1.70 (6H, s), 2.12 (6H, s), 2.39 (1H, m), 3.35 (2H, t), 6.36 (1H, s), 7.40-7.51 (2H, m), 7.80 (2H, m), 8.31 (1H, d).

Example 9

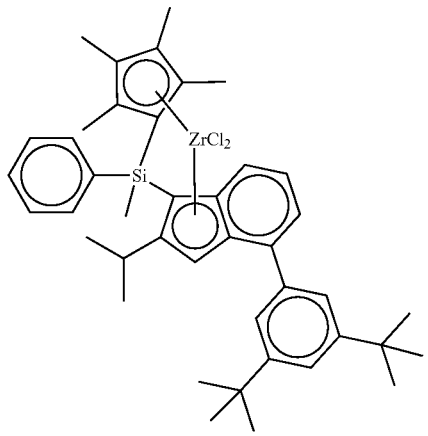

Preparation of Ligand Compound 2,3,4,5-tetramethylcyclopentadienyl Methylphenyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylphenyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylphenyl Silyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.26 (3H, s), 0.84 (6H, d), 1.35 (18H, s), 1.74 (6H, s), 2.15 (6H, s), 2.42 (1H, m), 6.29 (1H, s), 7.25-7.42 (7H, m), 7.85 (2H, s), 8.25 (1H, d).

Example 10

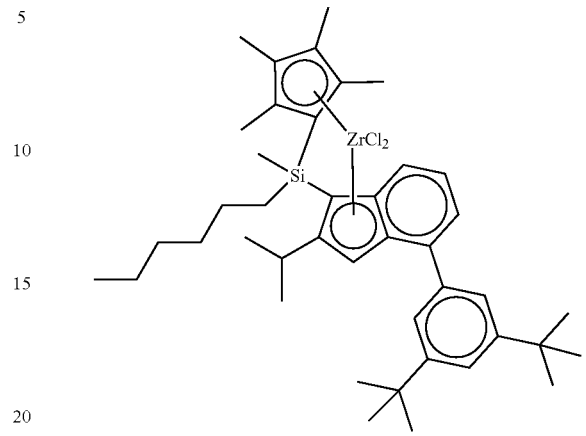

Preparation of Ligand Compound 2,3,4,5-tetramethylcyclopentadienyl Methylhexyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylhexyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylhexyl Silyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing ZrCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.25 (3H, s), 0.62 (2H, t), 0.84 (6H, d), 0.88 (3H, t), 1.29-1.30 (8H, m), 1.38 (18H, s), 1.72 (6H, s), 2.18 (6H, s), 2.42 (1H, m), 6.40 (1H, s), 7.32-7.35 (2H, m), 7.70 (2H, s), 8.15 (1H, m).

Example 11

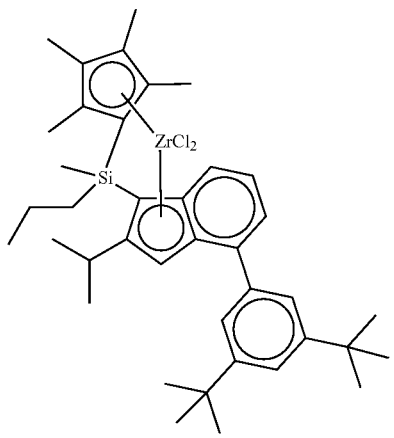

Preparation of Ligand Compound 2,3,4,5-tetramethylcyclopentadienyl Methylpropyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylpropyl silane (1.05 eq) was added thereto at −10° C., and stirred overnight at room temperature. In another reactor, (2-isopropyl-4-(3',5-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylpropyl Silyl (2-isopropyl-4-(3',5'-di-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.22 (3H, s), 0.64 (2H, t), 0.90 (3H, d), 0.94 (3H, t), 1.29 (2H, m), 1.34 (18H, s), 1.75 (6H, s), 2.14 (6H, s), 2.42 (1H, m), 6.43 (1H, s), 7.38-7.41 (2H, m), 7.72 (2H, s), 8.22 (1H, m).

Example 12

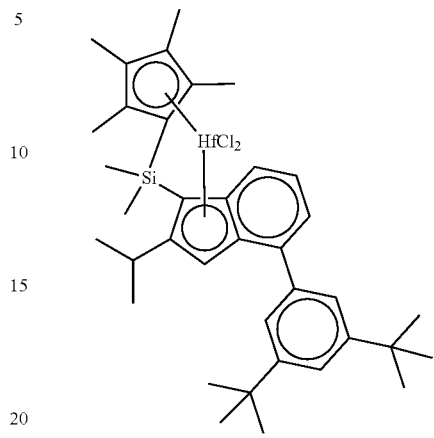

Preparation of Ligand Compound 2,3,4,5-tetramethylcyclopentadienyl Dimethyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $HfCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.24 (6H, s), 0.96 (6H, d), 1.42 (18H, s), 1.82 (6H, s), 2.24 (6H, s), 2.49 (1H, m), 6.42 (1H, s), 7.52-7.56 (2H, m), 7.78 (2H, s), 8.33 (1H, m).

Example 13

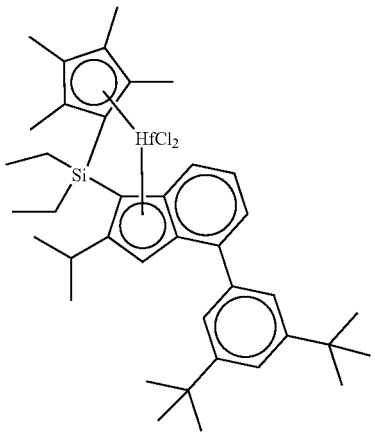

Preparation of Ligand Compound 2,3,4,5-tetramethylcyclopentadienyl Diethyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, diethylsilane (Silane, 1.05 eq) was added thereto at −10° C., and stirred overnight at room temperature. In another reactor, (2-isopropyl-4-(3',5-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Diethylsilyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.68 (4H, q), 091 (6H, d), 0.98 (6H, t), 1.52 (18H, s), 1.85 (6H, s), 2.33 (6H, s), 2.46 (1H, m), 6.42 (1H, s), 7.47-7.51 (2H, m), 7.83 (2H, s), 8.39 (1H, d).

Example 14

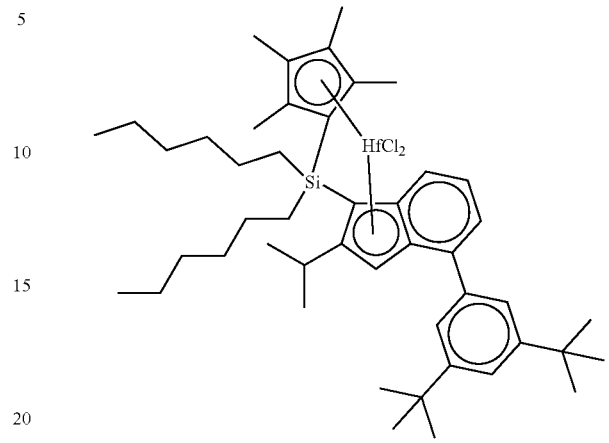

Preparation of Ligand Compound 2,3,4,5-tetramethylcyclopentadienyl Dihexyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dihexylsilane (Silane, 1.05 eq) was added thereto at −10° C., and stirred overnight at room temperature. In another reactor, (2-isopropyl-4-(3',5-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dihexylsilyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.70 (4H, t), 0.93 (6H, d), 1.08 (6H, t), 1.53-1.58 (16H, m), 1.72 (18H, s), 1.89 (6H, s), 2.12 (6H, s), 2.39 (1H, m), 6.46 (1H, s), 7.42-7.50 (2H, m), 7.73 (2H, s), 8.36 (1H, d).

Example 15

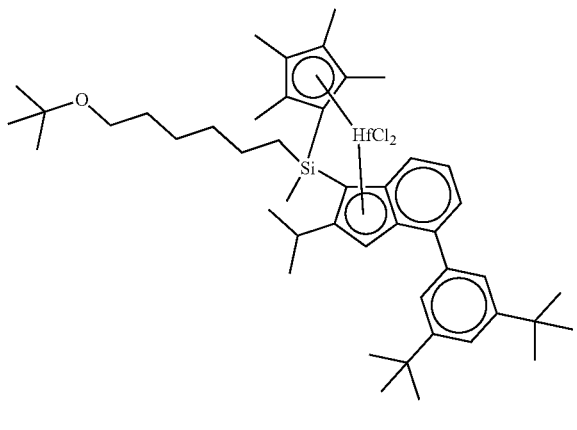

Preparation of Ligand Compound 2,3,4,5-tetramethylcyclopentadienyl 6-(tert-butoxy)hexyl)methyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, 6-(tert-butoxy)hexyl)methyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl 6-(tert-butoxy)hexyl) methylsilyl (2-isopropyl-4-(3',5'-di-tertbutylphenyl)) indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.21 (3H, s), 0.68 (2H, t), 0.92 (6H, d), 1.39-1.41 (4H, m), 1.45 (18H, s), 1.51 (2H, t), 1.60 (2H, t), 1.82 (6H, s), 2.42 (6H, s), 2.59 (1H, m), 3.48 (2H, t), 6.44 (1H, s), 7.52-7.59 (2H, m), 7.83 (2H, m), 8.35 (1H, d).

Example 16

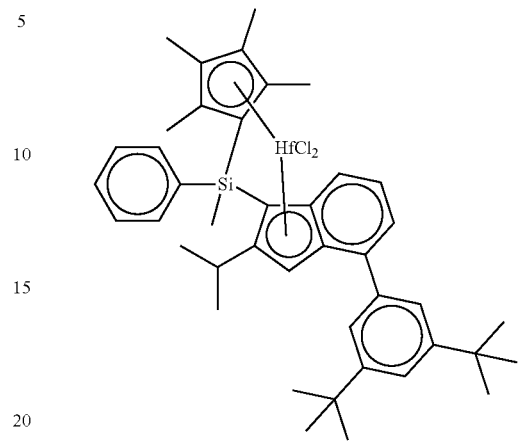

Preparation of Ligand Compound 2,3,4,5-tetramethylcyclopentadienyl Methylphenyl (2-isopropyl-4-(3', 5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylphenyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylphenyl Silyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing HfCl$_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, CDCl$_3$): 0.31 (3H, s), 0.94 (6H, d), 1.54 (18H, s), 1.74 (6H, s), 2.15 (6H, s), 2.72 (1H, m), 6.33 (1H, s), 7.28-7.32 (7H, m), 775 (2H, s), 8.48 (1H, d).

Example 17

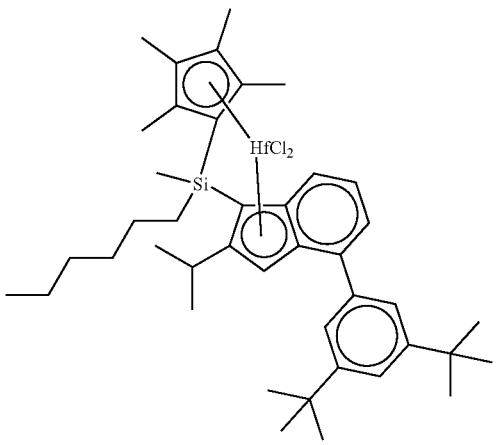

Preparation of Ligand Compound 2,3,4,5-tetramethylcyclopentadienyl Methylhexyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylhexyl silane (1.05 eq) was added thereto at −10° C., and stirred overnight at room temperature. In another reactor, (2-isopropyl-4-(3',5-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylhexyl Silyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $HfCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.27 (3H, s), 0.71 (2H, t), 0.85 (6H, d), 0.92 (3H, t), 1.39-1.44 (8H, m), 1.48 (18H, s), 1.72 (6H, s), 2.18 (6H, s), 2.42 (1H, m), 6.58 (1H, s), 7.47-7.51 (2H, m), 7.78 (2H, s), 8.18 (1H, m).

Example 18

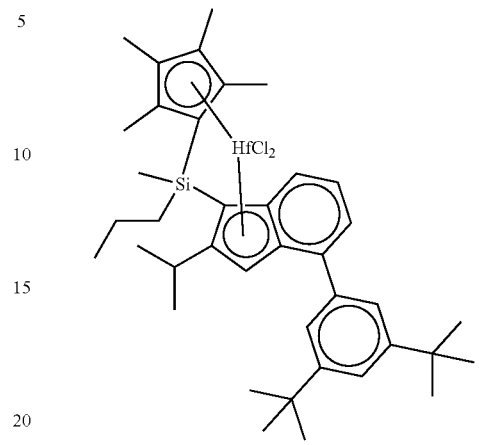

Preparation of Ligand Compound 2,3,4,5-tetramethylcyclopentadienyl Methylpropyl (2-isopropyl-4-(3',5'-di-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, methylpropyl silane (1.05 eq) was added thereto at −10° C., and stirred overnight at room temperature. In another reactor, (2-isopropyl-4-(3',5'-di-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Methylpropyl Silyl (2-isopropyl-4-(3',5'-di-tertbutylphenyl))indenyl Hafnium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $HfCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.33 (3H, s), 0.84 (2H, t), 1.10 (3H, d), 1.24 (3H, t), 1.89 (2H, m), 1.94 (18H, s), 1.99 (6H, s), 2.25 (6H, s), 2.51 (1H, m), 6.43 (1H, s), 7.41-7.48 (2H, m), 7.78 (2H, s), 8.02 (1H, m).

Example 19

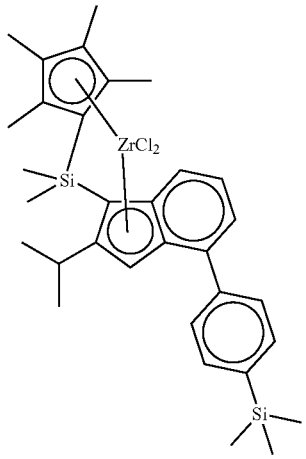

Preparation of Ligand Compound 2,3,4,5-tetramethylcyclopentadienyl Dimethyl (2-isopropyl-4-(4'-trimethylsilanyl-phenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-isopropyl-4-(4'-trimethylsilanyl-phenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-isopropyl-4-(4'-trimethylsilanyl-phenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.21 (6H, s), 0.29 (9H, s), 0.88 (6H, d), 1.81 (6H, s), 2.12 (6H, s), 2.39 (1H, m), 6.41 (1H, s), 7.38-7.49 (2H, m), 7.62 (1H, s), 7.75 (2H, d), 8.29 (1H, m).

Comparative Example 1

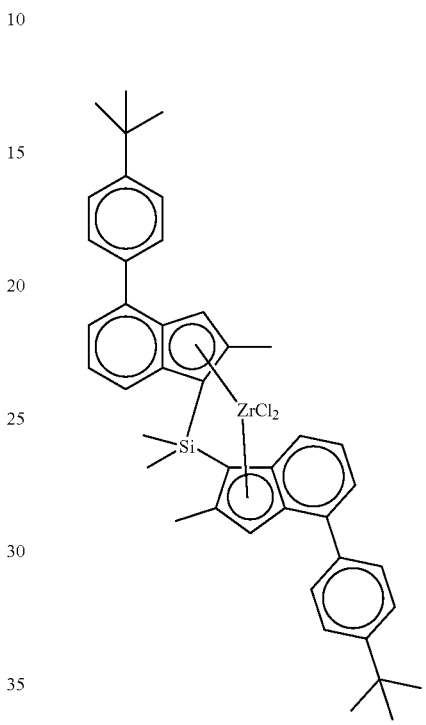

Preparation of Transition Metal Compound Dimethylsilanediylbis(2-methyl-4-(4'-tert-butyl-phenyl)indenyl) Zirconium Dichloride At room temperature, 143 g (0.54 mol) of 2-methyl-4-(4'-tert-butylphenyl)-1-indene was added to 2.4 L of toluene, followed by 143 mL of tetrahydrofuran and 234 mL of n-butyllithium solution (2.5 M toluene). Thereafter, the mixture was heated to 80° C. and stirred at that temperature for 1 hour. After cooling down to 40° C., 33.6 g (0.26 mmol) of dimethyldichlorosilane was added dropwise to the reaction solution. The reaction solution was stirred at 60° C. for 3 hours. After cooling down to room temperature, 218 mL of n-butyllithium solution (2.5 M toluene) was added dropwise. Thereafter, this solution was heated to 80° C. and stirred at that temperature for 1 hour. After cooling down to room temperature, 71.1 g (0.305 mol) of zirconium tetrachloride was slowly added. This solution was stirred at 45° C. for 2 hours, and the formed precipitate was separated by filtration through a G3 sintered glass filter and washed carefully with 700 mL of THF. The residue was then dried in an oil vacuum pump, and a product with a racemic:meso ratio of 1:1 was obtained in a yield of 155 g (80%).

Comparative Example 2

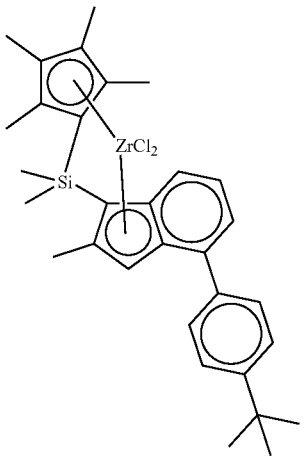

Preparation of Ligand Compound Dimethyl
Tetramethylramethylcyclopentadienyl
2-methyl-4-(4'-tert-butylphenyl)indenyl Silane Tetrahydrofuran (600 mL) and tetramethylcyclopentadiene (50 g) were added to a 2 L flask, and n-BuLi (2.5 M hexane solution, 170 mL) was slowly added dropwise at −10° C. under a nitrogen atmosphere, followed by stirring at room temperature for 12 hours. The temperature of the reaction solution was lowered to −10° C. again, and then dimethyl dichlorosilane (170 g) was added thereto. Thereafter, it was stirred at room temperature for 12 hours to react, and the reaction product was dried under vacuum. Thereafter, n-hexane (500 mL) was added thereto to dissolve the reaction product, and the product was filtered through a celite filter. Then, the filtered solution was dried under vacuum to obtain 70 g of dimethyl tetramethylcyclopentadienyl chlorosilane in the form of yellow oil (yield: 80%).

A flask into which toluene (200 mL), tetrahydrofuran (40 mL) and 2-methyl-4-(4'-t-butylphenyl)indene (50 g) were added was cooled down to −10° C., and then n-BuLi (2.5M hexane solution, 76 mL) was slowly added dropwise, followed by stirring at room temperature for 12 hours. The temperature of the reaction product was lowered to −10° C. again, and then dimethyl tetramethylcyclopentadienyl chlorosilane (38 g) synthesized above was added and reacted by stirring at room temperature for 12 hours. When the reaction was completed, water (400 mL) was added, followed by stirring at room temperature for 1.5 hours. Thereafter, the resulting solution was extracted with toluene, and dried under vacuum to obtain 80 g of dimethyl tetramethylcyclopentadienyl 2-methyl-4-(4'-t-butylphenyl)indenyl silane in the form of yellow oil (yield 95%).

Preparation of Transition Metal Compound
Tetramethylcyclopentadienyl Dimethylsilyl
2-methyl-4-(4'-tert-butylphenyl)indenyl Zr
Dichloride Dimethyl tetramethylcyclopentadienyl 2-methyl-4-(4'-t-butylphenyl) indenyl silane (50 g), which is the ligand compound prepared above, toluene (300 mL) and diethyl ether (100 mL) were added to a flask, and cooled down to −10° C. Then, n-BuLi (2.5 M hexane solution, 90 mL) was slowly added dropwise. After the dropwise addition, the reaction temperature was raised to room temperature, stirred for 48 hours, and then filtered. The obtained filtrate was dried under vacuum to obtain 40 g of tetramethylcyclopentadienyl dimethylsilyl 2-methyl-4-(4'-t-butylphenyl) indenyl dilithium salt in the form of solid (yield 80%), which was used directly in the next reaction without purification. The tetramethylcyclopentadienyl dimethylsilyl 2-methyl-4-(4'-t-butylphenyl) indenyl dilithium salt (40 g), toluene (40 mL) and ether (10 mL) were added to a flask and stirred. In a separate flask, a mixture of toluene (30 mL) and ZrCl$_4$ (20 g) was prepared. The mixture in the flask containing ZrCl$_4$ was slowly added dropwise to the flask containing the dilithium salt of the ligand compound with a cannula, and stirred at room temperature for 24 hours. After stirring, the mixture was dried under vacuum, extracted with methylene chloride (500 mL), filtered through a celite filter, and the filtrate was dried under vacuum. The obtained solid was washed with a 1:3 mixture of methylene chloride and n-hexane (50 mL), and then dried under vacuum to obtain 32 g of tetramethylcyclopentadienyl dimethylsilyl 2-methyl-4-(4'-t-butylphenyl) indenyl zirconium dichloride in the form of yellow solid (yield 60%).

Comparative Example 3

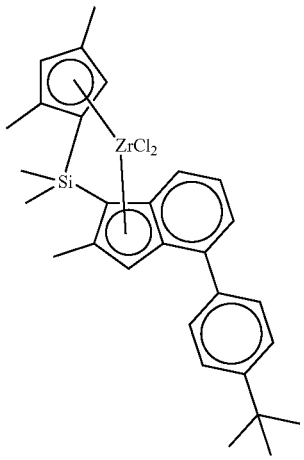

Preparation of Ligand Compound
2,4-dimethylramethylcyclopentadienyl
2-methyl-4-(4'-tert-butylphenyl)indenyl Silane Tetrahydrofuran (600 mL) and 1,3-dimethylcyclopentadiene (50 g) were added to a 2 L flask, and n-BuLi (2.5 M hexane solution, 170 mL) was slowly added dropwise at −10° C. under a nitrogen atmosphere, followed by stirring at room temperature for 12 hours. The temperature of the reaction solution was lowered to −10° C. again, and then dimethyl dichlorosilane (170 g) was added thereto. Thereafter, it was stirred at room temperature for 12 hours to react, and the reaction product was dried under vacuum. Thereafter, n-hexane (500 mL) was added thereto to dissolve the reaction product, and the product was filtered through a celite filter. Then, the filtered solution was dried under vacuum to obtain 70 g of dimethyl 2,4-dimethylcyclopentadienyl chlorosilane in the form of yellow oil (yield: 70%).

A flask into which toluene (200 mL), tetrahydrofuran (40 mL) and 2-methyl-4-(4'-t-butylphenyl)indene (50 g) were added was cooled down to −10° C., and then n-BuLi (2.5M hexane solution, 76 mL) was slowly added dropwise, followed by stirring at room temperature for 12 hours. The temperature of the reaction product was lowered to −10° C. again, and then dimethyl 2,4-dimethylcyclopentadienyl chlorosilane (38 g) was added and reacted by stirring at room temperature for 12 hours. When the reaction was completed, water (400 mL) was added, followed by stirring at room temperature for 1.5 hours. Thereafter, the resulting solution was extracted with toluene, and dried under vacuum to obtain 80 g of dimethyl 2,4-dimethylcyclopentadienyl 2-methyl-4-(4'-t-butylphenyl) indenyl silane in the form of yellow oil (yield 95%).

Preparation of Transition Metal Compound 2,4-dimethylcyclopentadienyl Dimethylsilyl 2-methyl-4-(4'-tert-butylphenyl)indenyl Zr Dichloride Dimethyl 2,4-dimethylcyclopentadienyl 2-methyl-4-(4'-t-butylphenyl) indenyl silane (50 g), which is the ligand compound prepared above, toluene (300 mL) and diethyl ether (100 mL) were added to a flask, and cooled down to −10° C. Then, n-BuLi (2.5 M hexane solution, 90 mL) was slowly added dropwise. After the dropwise addition, the reaction temperature was raised to room temperature, stirred for 48 hours, and then filtered. The obtained filtrate was dried under vacuum to obtain 40 g of 2,4-dimethylcyclopentadienyl dimethylsilyl 2-methyl-4-(4'-t-butylphenyl) indenyl dilithium salt in the form of solid (yield 80%), which was used directly in the next reaction without purification. The 2,4-dimethylcyclopentadienyl dimethylsilyl 2-methyl-4-(4'-t-butylphenyl) indenyl dilithium salt (40 g), toluene (40 mL) and ether (10 mL) were added to a flask and stirred. In a separate flask, a mixture of toluene (30 mL) and ZrCl$_4$ (20 g) was prepared. The mixture in the flask containing ZrCl$_4$ was slowly added dropwise to the flask containing the dilithium salt of the ligand compound with a cannula, and stirred at room temperature for 24 hours. After stirring, the mixture was dried under vacuum, extracted with methylene chloride (500 mL), filtered through a celite filter, and the filtrate was dried under vacuum. The obtained solid was washed with a 1:3 mixture of methylene chloride and n-hexane (50 mL), and then dried under vacuum to obtain 32 g of 2,4-dimethylcyclopentadienyl dimethylsilyl 2-methyl-4-(4'-t-butylphenyl) indenyl zirconium dichloride in the form of yellow solid (yield 60%).

Comparative Example 4

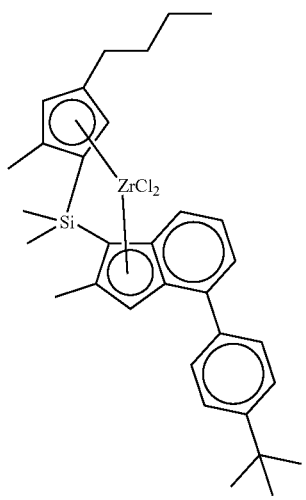

Preparation of Ligand Compound Dimethyl 4-butyl-2-methylcyclopentadienyl 2-methyl-4-(4'-tert-butylphenyl)indenyl Silane Tetrahydrofuran (600 mL) and 1-butyl-3-methylcyclopentadiene (50 g) were added to a 2 L flask, and n-BuLi (2.5 M hexane solution, 170 mL) was slowly added dropwise at −10° C. under a nitrogen atmosphere, followed by stirring at room temperature for 12 hours. The temperature of the reaction solution was lowered to −10° C. again, and then dimethyl dichlorosilane (170 g) was added thereto. Thereafter, it was stirred at room temperature for 12 hours to react, and the reaction product was dried under vacuum. Thereafter, n-hexane (500 mL) was added thereto to dissolve the reaction product, and the product was filtered through a celite filter. Then, the filtered solution was dried under vacuum to obtain 70 g of dimethyl 4-butyl-2-methylcyclopentadienyl chlorosilane in the form of yellow oil (yield: 70%).

A flask into which toluene (200 mL), tetrahydrofuran (40 mL) and 2-methyl-4-(4'-t-butylphenyl) indene (50 g) were added was cooled down to −10° C., and then n-BuLi (2.5M hexane solution, 76 mL) was slowly added dropwise, followed by stirring at room temperature for 12 hours. The temperature of the reaction product was lowered to −10° C. again, and then dimethyl 4-butyl-2-methylcyclopentadienyl chlorosilane (38 g) was added and reacted by stirring at room temperature for 12 hours. When the reaction was completed, water (400 mL) was added, followed by stirring at room temperature for 1.5 hours. Thereafter, the resulting solution was extracted with toluene, and dried under vacuum to obtain 80 g of dimethyl 4-butyl-2-methylcyclopentadienyl 2-methyl-4-(4'-t-butylphenyl) indenyl silane in the form of yellow oil (yield 95%).

Preparation of Transition Metal Compound 4-butyl-2-methylcyclopentadienyl Dimethylsilyl 2-methyl-4-(4'-tert-butylphenyl)indenyl Zr Dichloride Dimethyl 4-butyl-2-methylcyclopentadienyl 2-methyl-4-(4'-t-butylphenyl) indenyl silane (50 g), which is the ligand compound prepared above, toluene (300 mL) and diethyl ether (100 mL) were added to a flask, and cooled down to −10° C. Then, n-BuLi (2.5 M hexane solution, 90 mL) was slowly added dropwise. After the dropwise addition, the reaction temperature was raised to room temperature, stirred for 48 hours, and then filtered. The obtained filtrate was dried under vacuum to obtain 40 g of 4-butyl-2-methylcyclopentadienyl dimethylsilyl 2-methyl-4-(4'-t-butylphenyl) indenyl dilithium salt in the form of solid (yield 80%), which was used directly in the next reaction without purification. The 4-butyl-2-methylcyclopentadienyl dimethylsilyl 2-methyl-4-(4'-t-butylphenyl) indenyl dilithium salt (40 g), toluene (40 mL) and ether (10 mL) were added to a flask and stirred. In a separate flask, a mixture of toluene (30 mL) and ZrCl$_4$ (20 g) was prepared. The mixture in the flask containing ZrCl$_4$ was slowly added dropwise to the flask containing the dilithium salt of the ligand compound with a cannula, and stirred at room temperature for 24 hours. After stirring, the mixture was dried under vacuum, extracted with methylene chloride (500 mL), filtered through a celite filter, and the filtrate was dried under vacuum. The obtained solid was washed with a 1:3 mixture of methylene chloride and n-hexane (50 mL), and then dried under vacuum to obtain 32 g of 4-butyl-2-methylcyclopentadienyl dimethylsilyl 2-methyl-4-(4'-t-butylphenyl) indenyl zirconium dichloride in the form of yellow solid (yield 60%).

Comparative Example 5

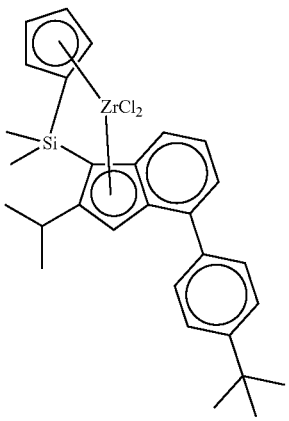

Preparation of Ligand Compound Cyclopentadienyl Dimethyl (2-isopropyl-4-(4'-tertbutylphenyl))indenyl Silane After dissolving indene in THF, n-BuLi (1.05 eq) was slowly added dropwise at −25° C., followed by stirring at room temperature for 3 hours. Then, silane (2 eq) was added at −10° C., followed by stirring overnight at room temperature. After vacuum drying, it was dissolved in THF. CPNa/THF solution (1 eq.) was slowly added dropwise at −25° C. After stirring at room temperature overnight, it was worked up with water and dried. A ligand was obtained by using a silica gel column.

Preparation of Transition Metal Compound Cyclopentadienyl Dimethylsilyl (2-isopropyl-4-(4'-tertbutylphenyl))indenyl Zirconium Dichloride The ligand was dissolved in toluene/ether (2/1) and n-BuLi (2.05 eq) was added at −25° C., followed by stirring at room temperature for 5 hours. A slurry was prepared by mixing $ZrCl_4$ (1 eq) with toluene and added to a flask, followed by stirring overnight at room temperature. When the reaction was completed, the solvent was vacuum-dried, and DCM was added again. Then, LiCl was removed through a filter, the filtrate was vacuum-dried, and toluene was added thereto, followed by recrystallization at room temperature. A catalyst precursor was obtained in the form of yellow solid.

$^1$H-NMR (500 MHz, $CDCl_3$): 0.40 (s, 6H), 0.86 (d, 6H), 1.33 (s, 9H), 2.38 (m, 1H), 6.40-6.51 (m, 4H), 7.31-7.49 (m, 6H), 8.29 (d, 1H).

Comparative Example 6

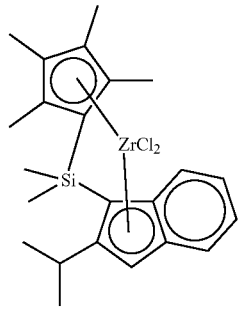

The above transition metal compound (2,3,4,5-tetramethylcyclopentadienyl dimethylsilyl (2-isopropyl)indenyl zirconium dichloride) was prepared according to the method disclosed in International Patent Publication WO 2018-185176 A1.

$^1$H-NMR (500 MHz, $CDCl_3$):1.10 (s, 3H), 1.16 (d, 3H), 1.20 (s, 3H), 1.38 (d, 3H), 1.87 (s, 6H), 1.97 (s, 3H), 1.99 (s, 3H), 3.02 (m, 1H), 6.96 (m, 1H), 7.05 (s, 1H), 7.31 (m, 1H), 7.58 (1H, d), 7.61 (1H, d).

Comparative Example 7

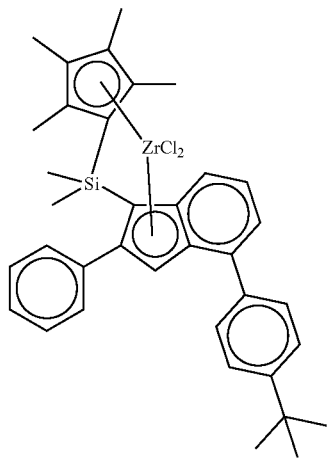

Preparation of Ligand Compound 2,3,4,5-tetramethylcyclopentadienyl Dimethyl (2-phenyl-4-(4'-tertbutylphenyl))indenyl Silane 2,3,4,5-tetramethylcyclopentadien (TMCP) was dissolved in tetrahydrofuran (THF), and n-BuLi (1.05 eq) was slowly added dropwise thereto at −25° C., followed by stirring at room temperature for 3 hours. Thereafter, dimethylsilane (Silane, 1.05 eq) was added thereto at −10° C., and stirred overnight at room temperature. In another reactor, (2-phenyl-4-(4'-tertbutylphenyl))indene was dissolved in a mixed solution of toluene/THF (5/1 by volume, 0.7 M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked up with water and dried to obtain a ligand.

Preparation of Transition Metal Compound 2,3,4,5-tetramethylcyclopentadienyl Dimethylsilyl (2-phenyl-4-(4'-tertbutylphenyl))indenyl Zirconium Dichloride The ligand prepared above was dissolved in a mixed solution of toluene/ether (2/1 by volume, 0.7 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. The resulting solid was filtered and vacuum-dried to obtain the above metallocene compound.

$^1$H-NMR (500 MHz, $CDCl_3$): 0.21 (s, 6H), 1.42 (s, 9H), 1.72 (s, 6H), 2.08 (s, 6H), 6.92 (s, 1H), 7.01 (d, 2H), 7.19 (m, 3H), 7.31 (d, 2H), 7.39 (d, 2H), 7.54 (d, 1H), 8.32 (d, 1H).

Comparative Example 8

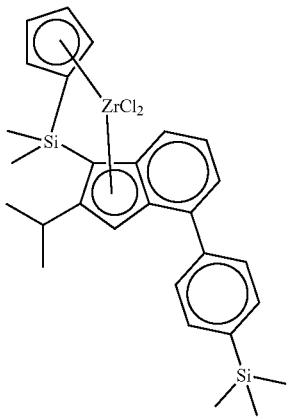

Preparation of Ligand Compound Cyclopentadienyl Dimethyl (2-isopropyl-4-(4'-trimethylsilanyl-phenyl))indenyl Silane After dissolving indene in THF, n-BuLi (1.05 eq) was slowly added dropwise at −25° C., followed by stirring at room temperature for 3 hours. Then, silane (2 eq) was added at −10° C., followed by stirring overnight at room temperature. After vacuum drying, it was dissolved in THF. Cyclopentadienyl sodium/THF solution (CPNa/THF solution, 1 eq.) was slowly added dropwise at −25° C. After stirring at room temperature overnight, it was worked up with water and dried. Thereafter, separation and purification were performed using a silica gel column to obtain a ligand.

Preparation of Transition Metal Compound Cyclopentadienyl Dimethylsilyl Dimethyl (2-isopropyl-4-(4'-trimethylsilanyl-phenyl))indenyl Zirconium Dichloride The ligand was dissolved in toluene/ether (2/1 by volume) and n-BuLi (2.05 eq) was added at −25° C., followed by stirring at room temperature for 5 hours. A slurry was prepared by mixing $ZrCl_4$ (1 eq) with toluene and added to a flask, followed by stirring overnight at room temperature. When the reaction was completed, the solvent was vacuum-dried, and dichloromethane was added again. Then, LiCl was removed through a filter, the filtrate was vacuum-dried, and toluene was added thereto, followed by recrystallization at room temperature. A catalyst precursor was obtained in the form of yellow solid.

$^1$H-NMR (500 MHz, $CDCl_3$): 0.20 (s, 6H), 0.23 (s, 9H), 0.85 (d, 6H), 2.38 (m, 1H), 6.40-6.50 (m, 5H), 7.42-7.49 (m, 2H), 7.62 (d, 2H), 7.82 (d, 2H), 8.30 (d, 2H).

<Preparation of Supported Catalyst>

3 g of a silica support (SP2410) was placed in a 2 L reactor under an argon (Ar) atmosphere, and 766 mL (13 mmol) of a 10 wt % methylaluminoxane (MAO) toluene solution was slowly added at room temperature, followed by stirring at 95° C. for 24 hours. After completion of the reaction, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula.

70 μmol of each of the transition metal compounds prepared in Examples and Comparative Examples was dissolved in 40 mL of toluene, and transferred to the reactor using a cannula. After stirring at 75° C. for 5 hours, the mixture was cooled down to room temperature and allowed to stand for 15 minutes to decant the solvent using a cannula. 400 mL of toluene was added, stirred for 1 minute, and allowed to stand for 15 minutes to decant the solvent using a cannula. This process was repeated twice. In the same manner, 400 mL of hexane was added thereto, stirred for 1 minute, and then allowed to stand for 15 minutes to decant the solvent using a cannula.

It was dried at room temperature under vacuum for 5 hours, and then dried at 45° C. under vacuum for 4 hours to obtain a supported catalyst.

<Polypropylene Polymerization>

A 2 L stainless steel reactor was vacuum-dried at 65° C., and cooled down. Then, 1.5 mmol of triethylaluminum, 2 bar of hydrogen, and 770 g of propylene were sequentially added at room temperature.

After stirring for 10 minutes, the temperature was raised to 70° C., and the supported metallocene catalyst was dissolved in 20 mL of hexane and added to the reactor at a nitrogen pressure. After performing the polymerization for 1 hour, unreacted propylene was ventilated.

The activity of the supported metallocene catalysts using one of the transition metal compounds prepared in Examples and Comparative Examples, and physical properties of the homo polypropylenes prepared using one of the supported metallocene catalysts were evaluated in the following manner. The results are shown in Table 1 below.

(1) Melt Index (MI)

The melt index was measured at 230° C. under a load of 2.16 kg according to the American Society for Testing and Materials ASTM D1238, and expressed as the weight (g) of the polymer that has been melted for 10 minutes.

(2) Melting Point (Tm)

The melting temperature, and melting point (Tm) of the propylene polymer were measured using differential scanning calorimeter (DSC 2920, manufactured by TA instrument). Specifically, the temperature was increased to 220° C., and maintained at that temperature for 5 minutes. After that, the temperature was lowered to 20° C., and further increased. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

(3) Molecular Weight Distribution (MWD, Polydispersity Index)

The molecular weight distribution (MWD) was determined by measuring a weight average molecular weight (Mw) and a number average molecular weight (Mn) of the polymer using gel permeation chromatography (GPC, manufactured by Water), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polymer sample of Examples and Comparative Examples was pretreated by dissolving in 1,2,4-trichlorobenzene containing 0.0125% of BHT at 160° C. for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

TABLE 1

| | Polymerization condition | Physical properties of homo polypropylene | | |
|---|---|---|---|---|
| | H$_2$ (ppm) | MI (g/10 min) | MWD | Tm (° C.) |
| Example 1 | 500 | 1258 | 2.21 | 143 |
| Example 2 | 530 | 1325 | 2.23 | 143 |
| Example 3 | 530 | 1247 | 2.15 | 144 |
| Example 4 | 550 | 1365 | 2.28 | 143 |
| Example 5 | 530 | 1354 | 2.27 | 143 |
| Example 6 | 530 | 1275 | 2.28 | 144 |
| Example 7 | 530 | 1354 | 2.21 | 144 |
| Example 8 | 530 | 1293 | 2.26 | 144 |
| Example 9 | 530 | 1257 | 2.23 | 144 |
| Example 10 | 530 | 1345 | 2.26 | 144 |
| Example 11 | 530 | 1409 | 2.21 | 144 |
| Example 12 | 550 | 1387 | 2.22 | 145 |
| Example 13 | 550 | 1228 | 2.27 | 145 |
| Example 14 | 550 | 1236 | 2.29 | 145 |
| Example 15 | 550 | 1245 | 2.25 | 145 |
| Example 16 | 550 | 1402 | 2.26 | 145 |
| Example 17 | 550 | 1396 | 2.19 | 145 |
| Example 18 | 550 | 1258 | 2.19 | 145 |
| Example 19 | 540 | 1258 | 2.30 | 142 |
| Comparative Example 1 | 4000 | 1358 | 2.82 | 153 |
| Comparative Example 2 | 3000 | 1289 | 2.75 | 152 |
| Comparative Example 3 | 3000 | 1225 | 2.79 | 152 |
| Comparative Example 4 | 3000 | 1387 | 2.81 | 152 |
| Comparative Example 5 | — | Unmeasurable due to low activity (activity <0.3) | 2.27 | No Tm due to atactic |
| Comparative Example 6 | — | Unmeasurable due to low activity (activity <0.3) | 2.27 | 152 |

TABLE 1-continued

| | Polymerization condition | Physical properties of homo polypropylene | | |
|---|---|---|---|---|
| | H$_2$ (ppm) | MI (g/10 min) | MWD | Tm (° C.) |
| Comparative Example 7 | 2500 | 1375 | 2.43 | 150 |
| Comparative Example 8 | — | Unmeasurable due to low activity (activity <0.3) | 3.20 | No Tm due to atactic |

Referring to Table 1, the metallocene compounds of Examples 1 to 19 according to an embodiment of the present disclosure provided a polypropylene having a high melt index (MI$_{2.16}$) of 1228 g/10 min to 1409 g/10 min even with a small amount of hydrogen, thereby confirming very good hydrogen reactivity. In addition, it can be confirmed from Examples 1 to 19 that the molecular weight distribution (MWD) was kept as narrow as about 2.15 to 2.3 even though hydrogen was used a lot. Moreover, the melting point (Tm) of Examples 1 to 19 was lowered to 142° C. to 145° C. despite the same homo polymerization, and thus it can be confirmed that a polypropylene which is excellent for soft multifilaments could be produced.

On the other hand, in the case of Comparative Examples 1 to 8, an excessive amount of hydrogen had to be introduced in the polymerization process in order to achieve a high melt index, and in the case of Comparative Examples 5, 6, and 8, it was not possible to measure the melt index of the prepared polymer due to low activity even though the excessive amount of hydrogen was introduced. Specifically, in the case of Comparative Examples 1 to 4 and Comparative Example 7, hydrogen reactivity was significantly lowered and an excessive amount of hydrogen had to be introduced in the polymerization process, because the substituent at position 2 in the indenyl ligand was methyl or phenyl. Therefore, the molecular weight distribution (MWD) was as high as about 2.45 to 2.82 and 2.43, and the melting point (Tm) was as high as about 152° C. to 153° C. and 150° C. In particular, in the case of Comparative Examples 5 and 8, only a hydrogen substituent was included in the cyclopentadienyl ring, so that tacticity of the catalyst collapsed during propylene polymerization, thereby forming atactic PP. In addition, as in Comparative Example 6, when hydrogen was substituted at position 4 in the indenyl ligand, it was impossible to measure the melt index due to reduced activity.

The invention claimed is:

1. A transition metal compound represented by the following Chemical Formula 1:

[Chemical Formula 1]

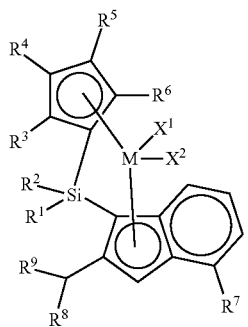

in Chemical Formula 1,

M is a Group 4 transition metal, $X^1$ and $X^2$ are the same as or different from each other, and are each independently halogen, $R^1$ and $R^2$ are the same as or different from each other, and are each independently $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl, $R^3$ to $R^6$ are the same as or different from each other, and are each independently $C_{1-20}$ alkyl, $R^7$ is $C_{6-20}$ aryl substituted with at least one functional group-selected from the group consisting of hydrogen, $C_{1-20}$ alkyl, and $C_{1-20}$ alkylsilyl, and $R^8$ and $R^9$ are the same as or different from each other, and are each independently $C_{1-20}$ alkyl.

2. The transition metal compound of claim 1, wherein the M is zirconium (Zr) or hafnium (Hf).

3. The transition metal compound of claim 1, wherein the $R^1$ and $R^2$ are each independently $C_{1-8}$ linear or branched alkyl, $C_{2-12}$ linear or branched alkoxyalkyl, or $C_{6-12}$ aryl.

4. The transition metal compound of claim 1, wherein each of the $R^3$ to $R^6$ are each independently $C_{1-6}$ linear or branched alkyl.

5. The transition metal compound of claim 1, wherein the $R^7$ is phenyl, phenyl substituted with $C_{1-6}$ linear or branched alkyl, phenyl substituted with $C_{1-6}$ linear or branched alkylsilyl, naphthyl, naphthyl substituted with $C_{1-6}$ linear or branched alkyl, or naphthyl substituted with $C_{1-6}$ linear or branched alkylsilyl.

6. The transition metal compound of claim 1, wherein of the $R^8$ and $R^9$ are each independently $C_{1-6}$ linear or branched alkyl.

7. The transition metal compound of claim 1, which is represented by the following Chemical Formula 1-1 or Chemical Formula 1-2:

[Chemical Formula 1-1]

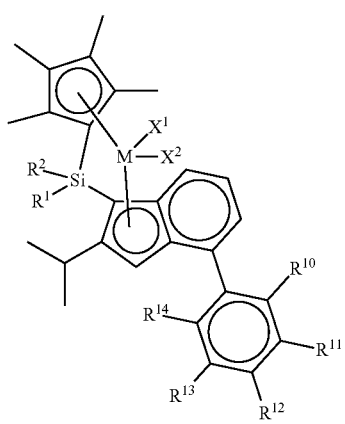

[Chemical Formula 1-2]

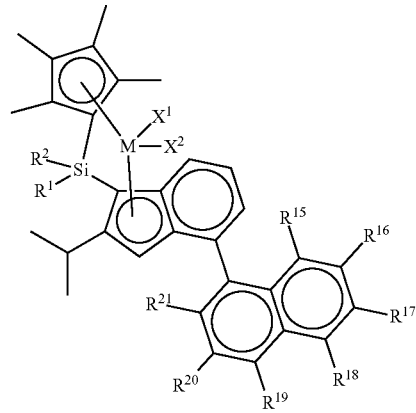

in Chemical Formulae 1-1 and 1-2,

M, $X^1$, $X^2$, $R^1$, and $R^2$ are as defined in claim 1, and $R^{10}$ to $R^{14}$ and $R^{15}$ to $R^{21}$ are the same as or different from each other, and are each independently hydrogen, $C_{1-20}$ alkyl, or $C_{1-20}$ alkylsilyl.

8. The transition metal compound of claim 1, which is any one of compounds represented by the following structural formulae:

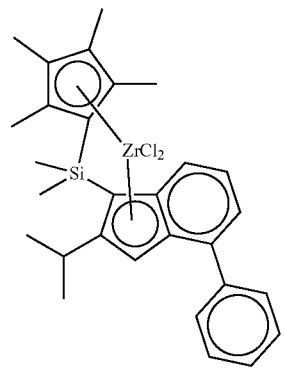

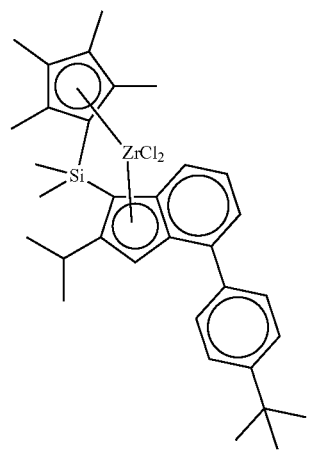

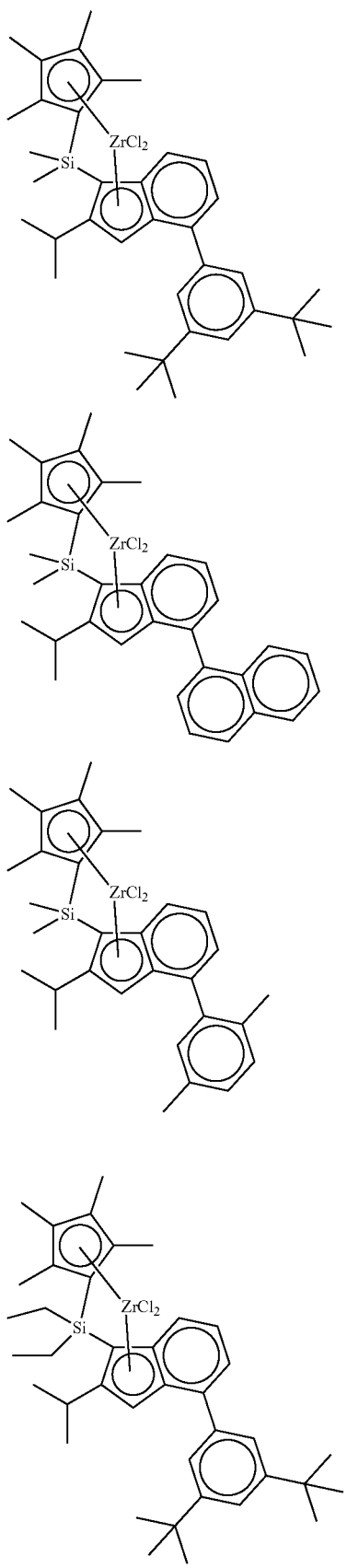
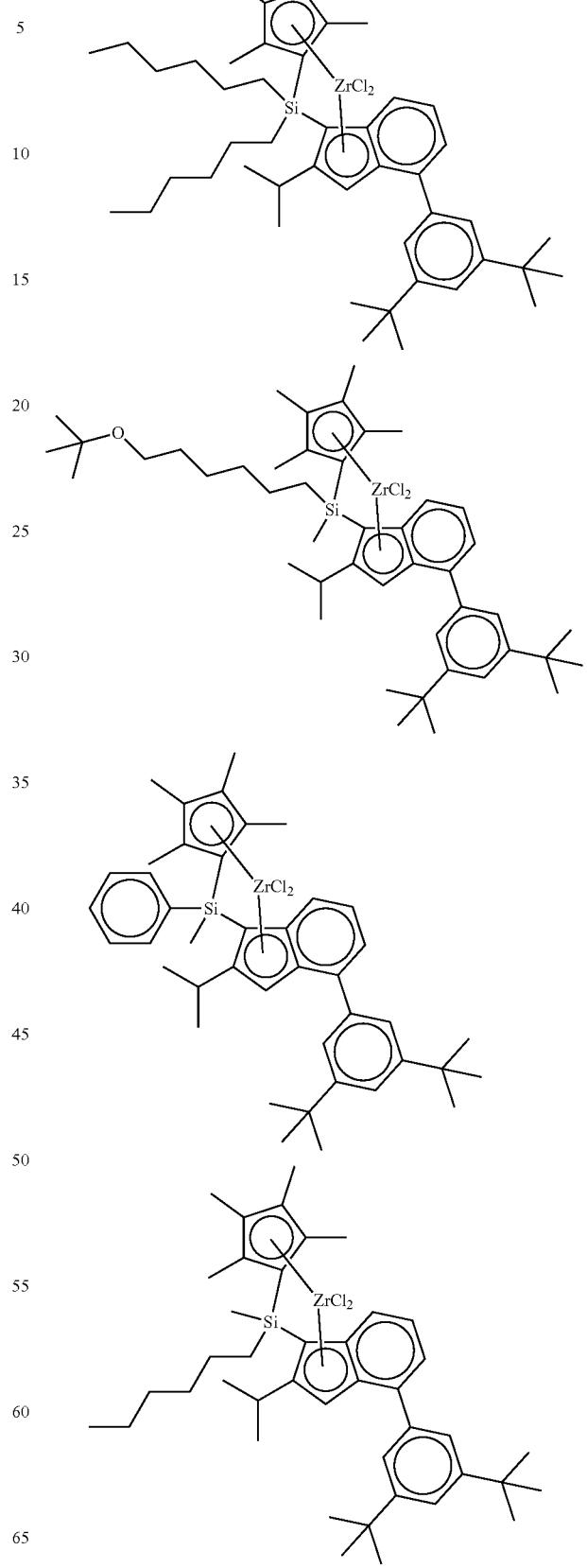

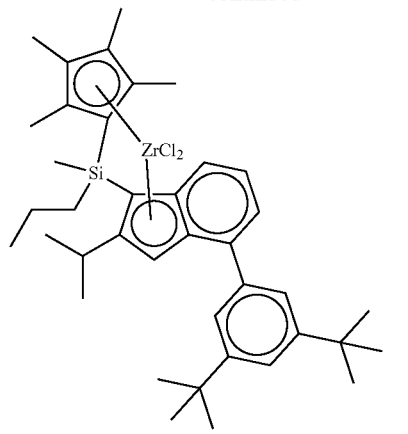
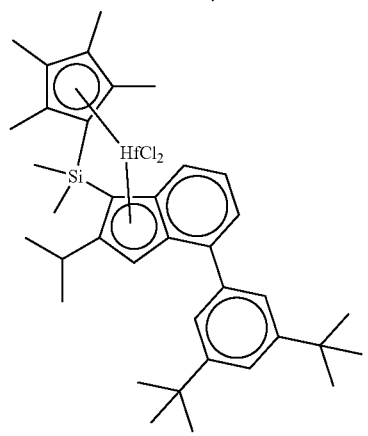
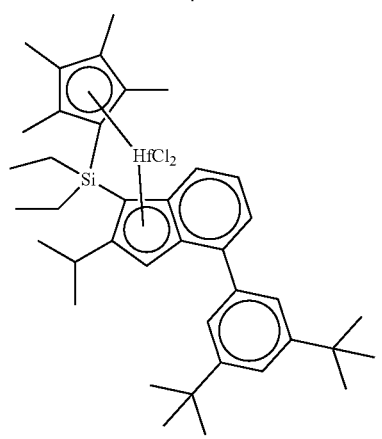
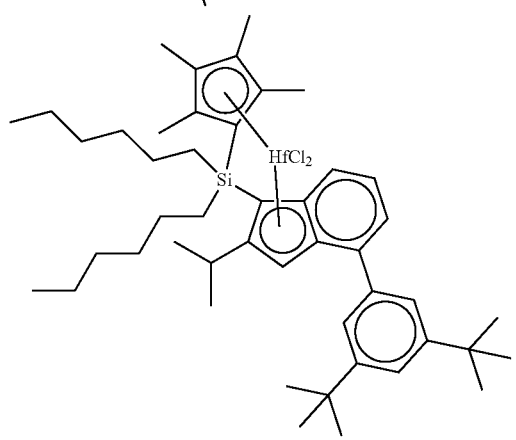
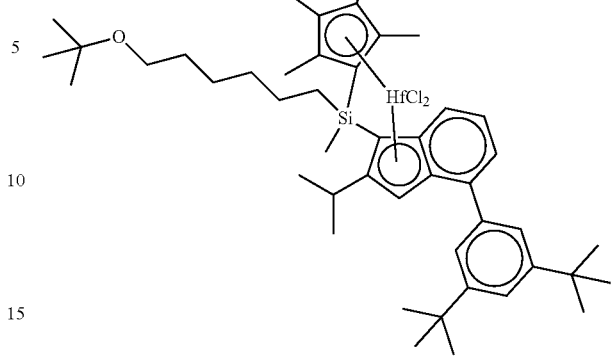
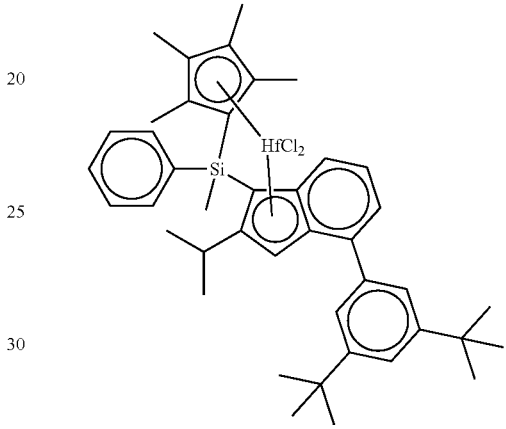
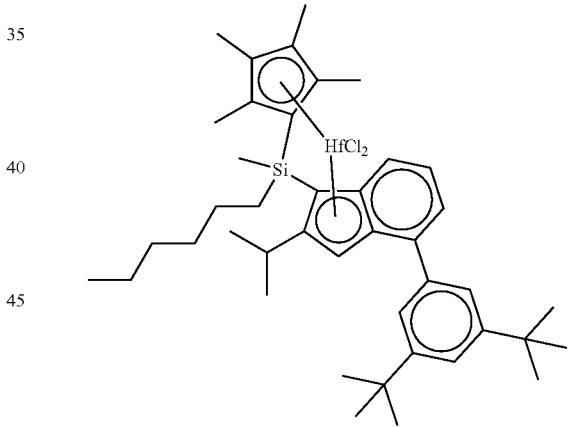
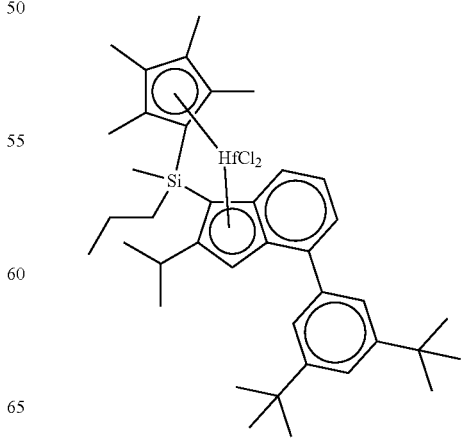

-continued

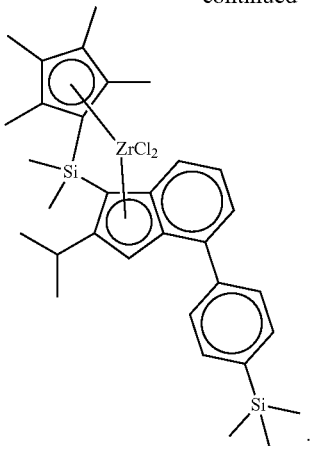

9. A catalyst composition comprising the transition metal compound of claim 1.

10. The catalyst composition of claim 9, comprising the transition metal compound and a support.

11. The catalyst composition of claim 9, further comprising at least one cocatalyst selected from the group consisting of compounds represented by the following Chemical Formulae 2 to 4:

$$—[Al(R^{22})—O]_m—$$ [Chemical Formula 2]

in Chemical Formula 2,

R$^{22}$ are the same as or different from each other, and are each independently halogen, C$_{1-20}$ alkyl, or C$_{1-20}$ haloalkyl; and m is an integer of 2 or more;

$$J(R^{23})_3$$ [Chemical Formula 3]

in Chemical Formula 3,

R$^{23}$ are the same as or different from each other, and are each independently halogen, C$_{1-20}$ alkyl, or C$_{1-20}$ haloalkyl; and J is aluminum or boron;

$$[E-H]^+[ZQ_4]^-$$ [Chemical Formula 4]

in Chemical Formula 4,

E is a neutral or cationic Lewis base;

H is a hydrogen atom;

Z is a group 13 element; and

Q are the same as or different from each other, and are each independently C$_{6-20}$ aryl or C$_{1-20}$ alkyl unsubstituted or substituted with a substituent selected from the group consisting of halogen, C$_{1-20}$ alkyl, C$_{1-20}$ alkoxy, and C$_{6-20}$ phenoxy.

12. A method for preparing a polypropylene, comprising a step of polymerizing propylene monomers in the presence of the catalyst composition of claim 9.

13. The method for preparing a polypropylene of claim 12, wherein the polymerization step is performed while introducing 1500 ppm or less of hydrogen gas based on the propylene monomers.

14. The method for preparing a polypropylene of claim 12, wherein the polypropylene is a homopolymer.

15. The method for preparing a polypropylene of claim 14, wherein the polypropylene has a molecular weight distribution (Mw/Mn) of 2.35 or less, a melt index (MI$_{2.16}$, measured at 230° C. under a load of 2.16 kg) of 1000 g/10 min to 1500 g/10 min, and a melting point (Tm) of 148° C. or less.

* * * * *